(12) United States Patent
Baks et al.

(10) Patent No.: US 8,776,259 B2
(45) Date of Patent: Jul. 8, 2014

(54) DRM SYSTEM

(71) Applicant: Koninklijke Philips N. V., Eindhoven (NL)

(72) Inventors: Wouter Baks, Best (NL); Franciscus L. A. J. Kamperman, Geldrop (NL); Petrus J. Lenoir, Hertogenbosch (NL); Lukasz Szostek, Eindhoven (NL)

(73) Assignee: Koninklike Philips N.V., Eindhoven (NL)

( * ) Notice: Subject to any disclaimer, the term of this patent is extended or adjusted under 35 U.S.C. 154(b) by 0 days.

(21) Appl. No.: 14/058,492

(22) Filed: Oct. 21, 2013

(65) Prior Publication Data

US 2014/0130181 A1 May 8, 2014

Related U.S. Application Data

(63) Continuation of application No. 12/088,006, filed as application No. PCT/IB2006/053339 on Sep. 18, 2006, now Pat. No. 8,595,853.

(30) Foreign Application Priority Data

Sep. 30, 2005 (EP) ..................................... 05109043

(51) Int. Cl.
*G06F 21/00* (2013.01)

(52) U.S. Cl.
USPC ................. 726/28; 726/26; 726/27; 380/247; 380/248; 380/249; 380/250

(58) Field of Classification Search
CPC . G06F 21/10; G06F 2221/2141; G06F 21/60; H04L 2463/101; H04L 2463/102
USPC ................................ 726/26–28; 380/247–250
See application file for complete search history.

(56) References Cited

U.S. PATENT DOCUMENTS

2003/0115069 A1 6/2003 Pence et al.
2004/0024688 A1 2/2004 Bi et al.
(Continued)

FOREIGN PATENT DOCUMENTS

JP 2005004263 A 1/2005
JP 2005243015 A 9/2005
(Continued)

OTHER PUBLICATIONS

Paul Koster, et al, "Identity Based DRM: Personal Entertainment Domain", Conference on Communications and Multimedia Security (CMS) September 19-21, 2005, LNCS 3677, pp. 42-54.

(Continued)

*Primary Examiner* — Ghazal Shehni

(57) ABSTRACT

A method of and system for digital rights management, in which access to a piece of content is granted in accordance with a license owned by a license owner to a client who is a member of a domain. This requires successfully verifying that a membership relation exists between the client and the domain as reflected in a first state variable, and that an association relation exists between the license owner and the domain as reflected in a second state variable. Both relationships are revoked by executing an online protocol between the parties in the relationship after which both remove the corresponding state variable. The domain controller propagates the state administration relating to the domain is propagated to the client so that the client can update its state administration.

8 Claims, 11 Drawing Sheets

(56) References Cited

U.S. PATENT DOCUMENTS

Figure 1:
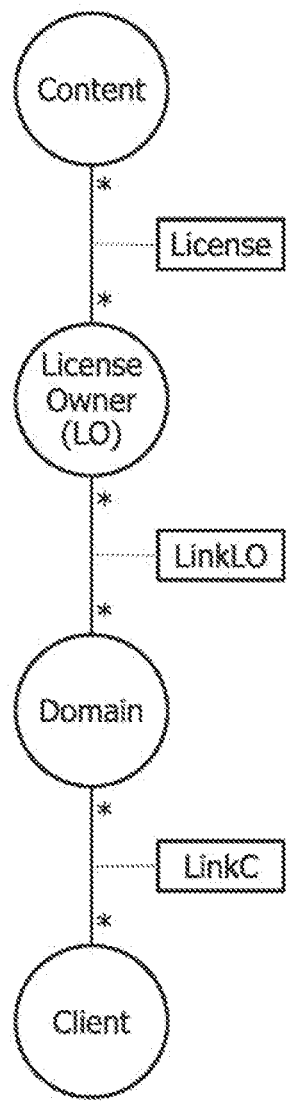

| | | |
|---|---|---|
| 2005/0131833 A1 | 6/2005 | Martinelli et al. |
| 2005/0177783 A1 | 8/2005 | Agrawala et al. |
| 2005/0182727 A1 | 8/2005 | Robert et al. |
| 2005/0229257 A1 | 10/2005 | Kim et al. |
| 2005/0268090 A1 | 12/2005 | Saw et al. |
| 2006/0190621 A1 | 8/2006 | Kamperman et al. |
| 2007/0162979 A1 | 7/2007 | Kamperman et al. |

FOREIGN PATENT DOCUMENTS

| | | |
|---|---|---|
| JP | 2007501967 A | 2/2007 |
| JP | 2007519090 A | 7/2007 |
| WO | 03098931 A1 | 11/2003 |
| WO | 2004027588 A2 | 4/2004 |
| WO | 2004038568 A2 | 5/2004 |
| WO | 2005010879 A2 | 2/2005 |
| WO | 2005036854 A1 | 4/2005 |
| WO | 2005055022 A1 | 6/2005 |
| WO | 2005088896 A1 | 9/2005 |
| WO | 2005093544 A1 | 10/2005 |
| WO | 2005011760 A1 | 11/2005 |

OTHER PUBLICATIONS

W. Jonker et al, "Secure Content Management in Authorised Domains", Conference Putlication, Sep. 12-16, 2002, pp. 467-474.

DRM SYSTEM

This application claims the benefit or priority of and describes relationships between the following applications: wherein this application is a continuation of U.S. patent application Ser. No. 12/088,006, filed Mar. 25, 2008, which is the National Stage of International Application No. PCT/IB2006/053339, filed Sep. 18, 2006, which claims the priority of foreign application EP05109043.9 filed Sep. 30, 2005, all of which are incorporated herein in whole by reference.

In recent years, the number of content protection systems available has been growing rapidly. Some of these systems only protect the content against unauthorized copying, while others restrict the user's ability to access the content. These systems are often referred to as Digital Rights Management (DRM) systems.

Consumers want to enjoy content without hassle and with as few limitations as possible. They want to network their devices to enable all types of different applications and easily access any type of content. They also want to be able to share/transfer content in their home environment without limitations.

Authorized Domains

The concept of Authorized Domains (ADs) tries to find a solution to both serve the interests of the content owners (that want protection of their intellectual property) and the content consumers (that want unrestricted use of the content). The basic principle is to have a controlled network environment in which content can be used relatively freely as long as it does not cross the border of the authorized domain. Typically, authorized domains are centered around the home environment, also referred to as home networks.

Of course, other contexts are also possible. A user could for example take a portable device for audio and/or video with a limited amount of content with him on a trip, and use it in his hotel room to access or download additional content stored on his personal audio and/or video system at home. Even though the portable device is outside the home network, it is a part of the user's authorized domain. In this way, an Authorized Domain (AD) is a system that allows access to content by devices in the domain, but not by any others.

Authorized domains need to address issues such as authorized domain identification, device check-in, device check-out, rights check-in, rights check-out, content check-in, content check-out, as well as domain management. For a more extensive introduction to the use of an Authorized Domain, etc., see S. A. F. A. van den Heuvel, W. Jonker, F. L. A. J. Kamperman, P. J. Lenoir, "Secure Content Management in Authorised Domains", Philips Research, The Netherlands, IBC 2002 conference publication, pages 467-474, held at 12-16 Sep. 2002 or Paul Koster, Frank Kamperman, Peter Lenoir and Koen Vrielink, "Identity based DRM: Personal Entertainment Domain", Conference on Communications and Multimedia Security (CMS) 2005, LNCS 3677, pp. 42-54, Salzburg, Austria, Sep. 19-21, 2005.

Some Forms of Authorized Domain

Various proposals exist that implement the concept of authorized domains to some extent. In so-called device based ADs, the domain is formed by a specific set of hardware devices or software applications (referred to collectively as clients hereafter) and content. A domain manager or controller, which can be one or more of the clients, a smart card or another device, controls which clients may join the domain. Only the specific set of clients in the domain (the members) is allowed to make use of the content of that domain, e.g. to open, copy, play or export it. Examples of such device-based ADs are given in international patent application WO 03/098931, international patent application WO 2005/088896 and international patent application WO 04/027588 by the same applicant, all of which are hereby incorporated by reference.

One type of device-based AD allows a set of clients bound to a domain to access content bound to that domain. This double binding assures that all the members can access the content. This structure is often established by implementing the bindings through a shared secret key. This key is chosen by the domain manager and distributed to all the members. When content is bound to the domain, the license is cryptographically linked to the domain by means of encryption with the shared key. Alternatively the content may be directly bound to one client, and the clients remain bound to the AD.

Another type of AD is the so-called person-based AD, where the domain is based on persons instead of devices. An example of such a system is described in international patent application WO 04/038568 by the same applicant, incorporated herein by reference, in which content is coupled to persons, which then are grouped into a domain.

A so-called Hybrid Authorized Domain-based DRM system ties content to a group that may contain devices and persons. This group is typically limited to a household, such that:
1. content can be watched on any of the members that belong to the household (e.g. TV in Living, TV in Bedroom, PC)
2. content can be watched by any of the users that belong to the household after they have authenticated themselves on any client (such as a television in a hotel room). Such authentication normally involves a user authentication device such as a smart card.

Examples of hybrid AD systems can be found in international patent application WO 2005/010879 and in international patent application WO 2005/093544, both incorporated herein by reference.

Generally speaking, an AD comprises a group of Clients. A Client generally speaking is a functional entity that can acquire and parse Licenses and Links for the purpose of getting access to an instance of Content based on the rights expressed in those Licenses and Links. Typically a Client is embodied as one or more software applications and/or hardware components. For example, a Client may be provided as a software application on a device such as a mobile phone or portable music player. A Client usually comprises a processor to perform the necessary operations and is equipped with a memory to store Content and/or instructions to be executed by the processor. Clients who are comprised in the AD are referred to as Member Clients or just Members for short.

Content is made available to the Member Clients by one or more License Owners (LO). A License Owner generally speaking is an entity that is representative of a User in a Domain environment. A User is an individual that interacts with the system. A User can be granted rights for an instance of Content. Such a license grant can be represented in the system by providing a License that links (a specific instance of) Content to the License Owner. A License Owner can be implemented by providing information in a data structure, record in a database or software object. The relation with the User is not explicitly defined in the system, but can for instance be realized by the User having a Device containing that information.

A License contains permissions and restrictions that are specific for the Content item involved. Note that there can be many, e.g. 15,000 Licenses in a Domain configuration and that issuing them and communicating them to Clients can take a significant amount of resources.

A Client that intends to access a piece of Content must be licensed to do so. To determine if a Client is licensed, it must be proven that:

The right to access a piece of Content is "owned" by a License Owner, and

That License Owner is associated with a Domain, and

The Client is a member of that Domain.

In other words, the License Owners should be entitled to access that Content and should be associated with the Domain. The ability to access Content by a Client implies that the entire authorization chain Client→Domain→License Owner→Content is in place and that every relation is valid. Changes made in an established configuration of relations can require relations to be invalidated to preserve consistency. In a partitioned system, all entities in the chain can be deployed on different hosts that need not be connected to each other at all times.

FIG. 1 schematically illustrates an authorization chain from Client to Content where every relationship can have a multiplicity greater than 1 in each direction, as indicated by the symbol '*'.

Figure 2:
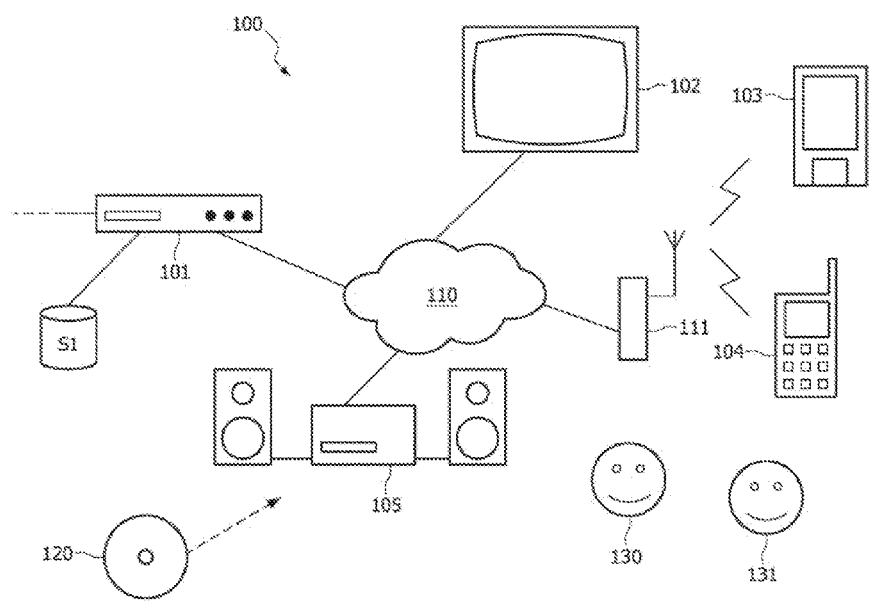

FIG. 2 schematically illustrates an exemplary system comprising devices and persons forming an authorized domain.

Figure 3:
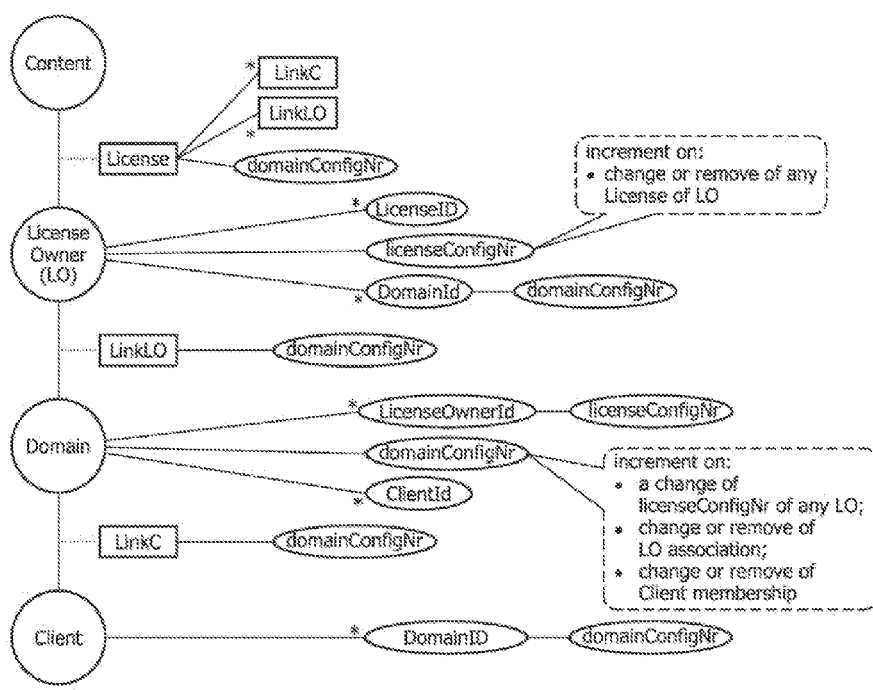

FIG. 3 schematically illustrates a state mechanism in which a proliferation of domain links attach to licenses to unconnected clients for Communicating all LinkLOs and LinkCs in the Domain configuration to Clients and a configuration number is used for relations by links for Guarding state of LinkC, LinkLO and all Licenses of a License Owner.

Figure 4:
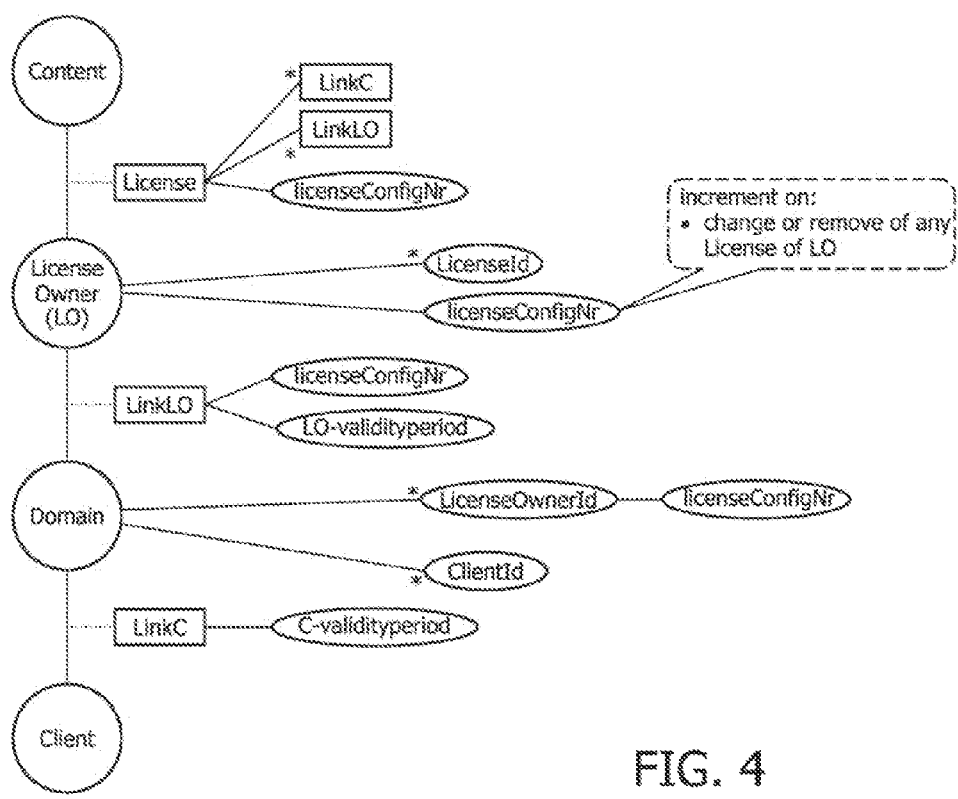

FIG. 4 schematically illustrates a state mechanism in which Validity Periods for a Link are used for Guarding LinkC and LinkLO and enforcing propagation of licenseConfigNr and proliferation of Domain Links attached to Licenses and to unconnected Clients are used for communicating the LinkLO of the License Owner and all LinkCs in the Domain configuration to Clients, and in which a Configuration number for Relations by Links is used for a Guarding a state of all Licenses of a License Owner.

Figure 5:
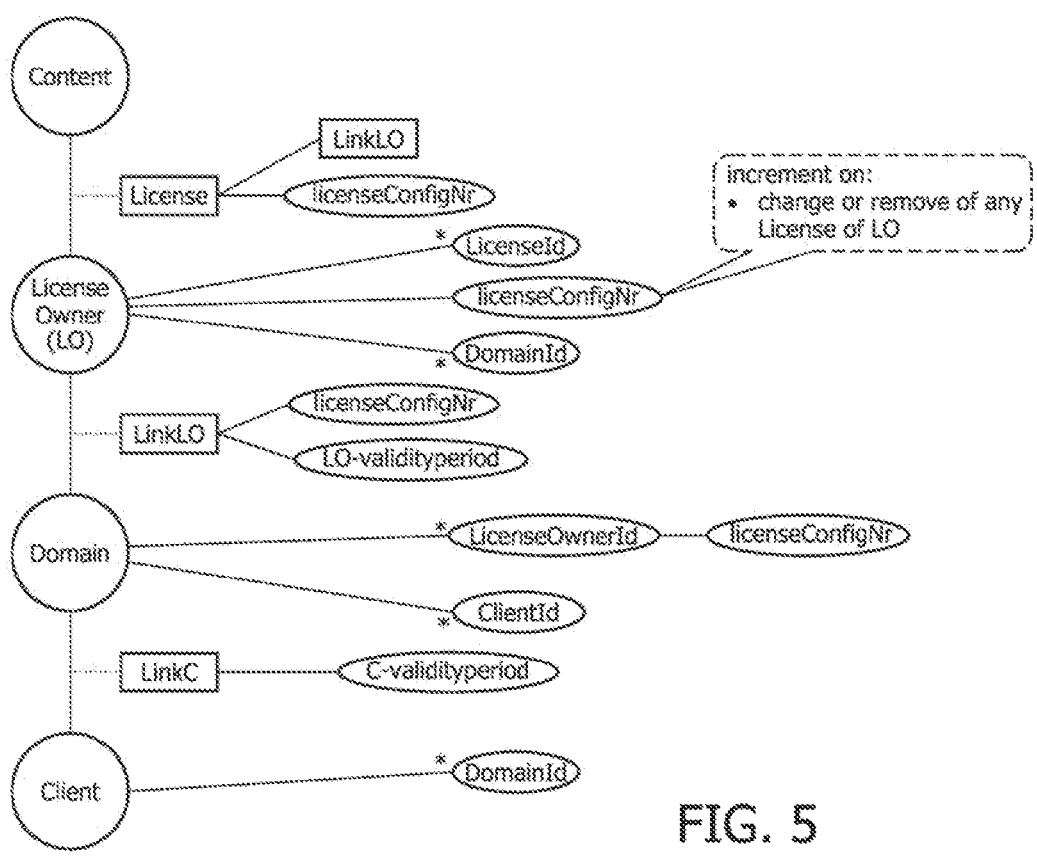

FIG. 5 schematically illustrates a state mechanism in which an Individual State for Relation is used for Guarding the state of LinkC and Validity Periods for a Link are used for Guarding LinkC and LinkLO, enforcing propagation of licenseConfigNr and enforcing information exchange between License Owner and Domain and enforcing Domain configuration information exchange between Client and Domain and in which the Proliferation of Domain Links attached to Licenses to unconnected Clients is used for Communicating the LinkLO for the License Owner to Clients, and in which a Configuration number for Relations by Links is used for Guarding the state of all Licenses of a License Owner.

Figure 6:
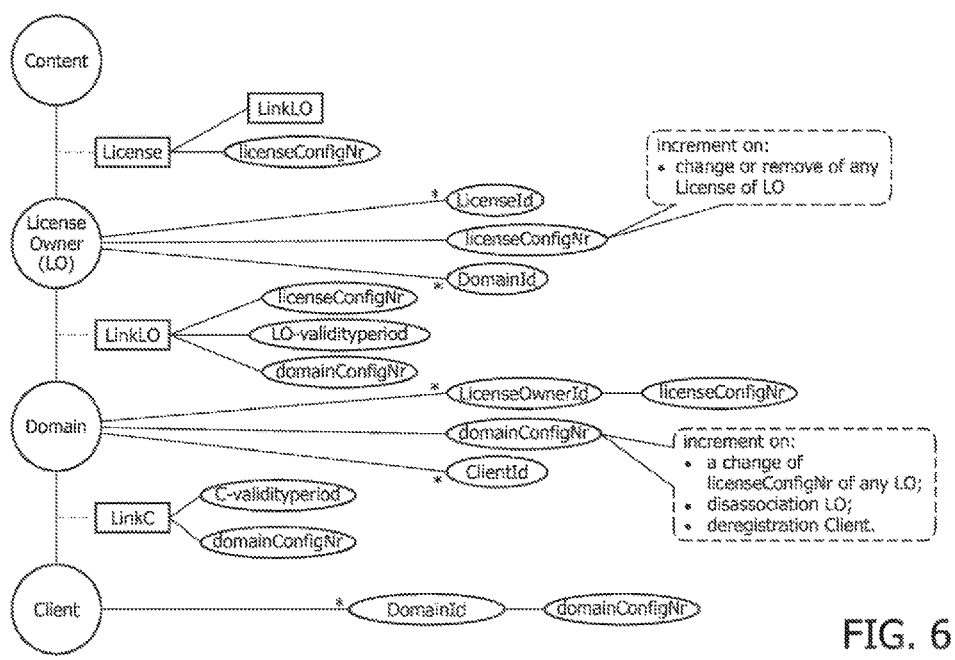

FIG. 6 schematically illustrates a state mechanism in which an Individual State for a Relation is used for Guarding a state of LinkC, and in which Validity Periods for a Link are used for Guarding LinkC and LinkLO, enforcing propagation of licenseConfigNr and enforcing information exchange between License Owner and Domain and enforcing Domain configuration information exchange between Client and Domain, and in which a Proliferation of Domain Links attached to Licenses to unconnected Clients is used for Communicating the LinkLO for the License Owner to Clients, and in which a Configuration number for Relations by State is used for Guarding state of LinkLO and LinkC by domainConfigNr, and in which a Configuration number for Relations by Links is used for Guarding a state of all Licenses of a License Owner.

Figure 7:
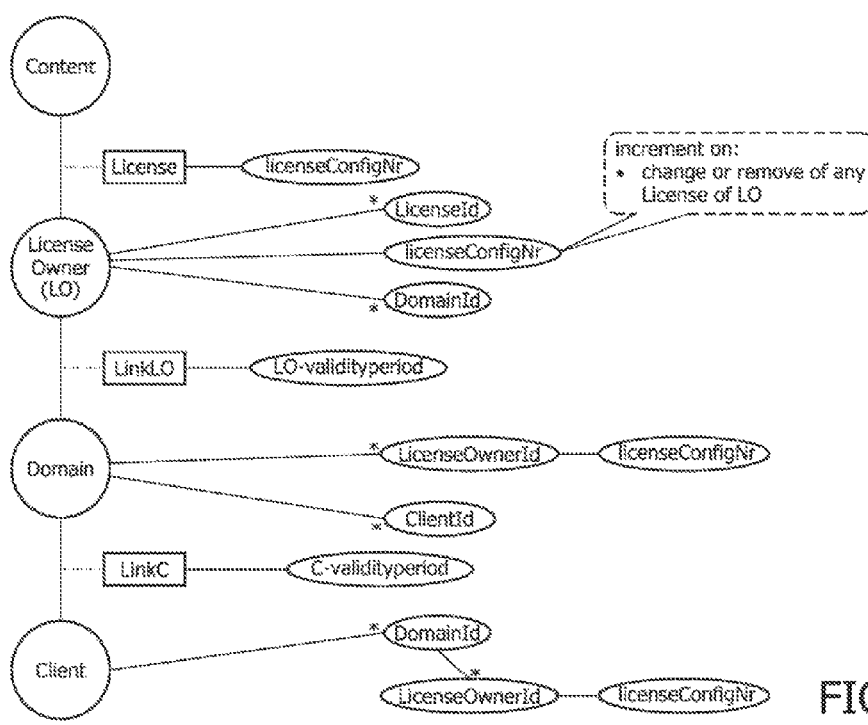

FIG. 7 schematically illustrates a state mechanism in which an Individual State for a Relation is used for Guarding a state of LinkC and LinkLO, and in which Validity Periods for a Link are used for Guarding LinkC and LinkLO, enforcing propagation of licenseConfigNr and enforcing information exchange between License Owner and Domain and enforcing Domain configuration information exchange between Client and Domain, and in which the Configuration number for Relations by State is used for Guarding the state of all Licenses of a License Owner by a licenseConfigNr in the state of Domain and the state of Client.

Figure 8:
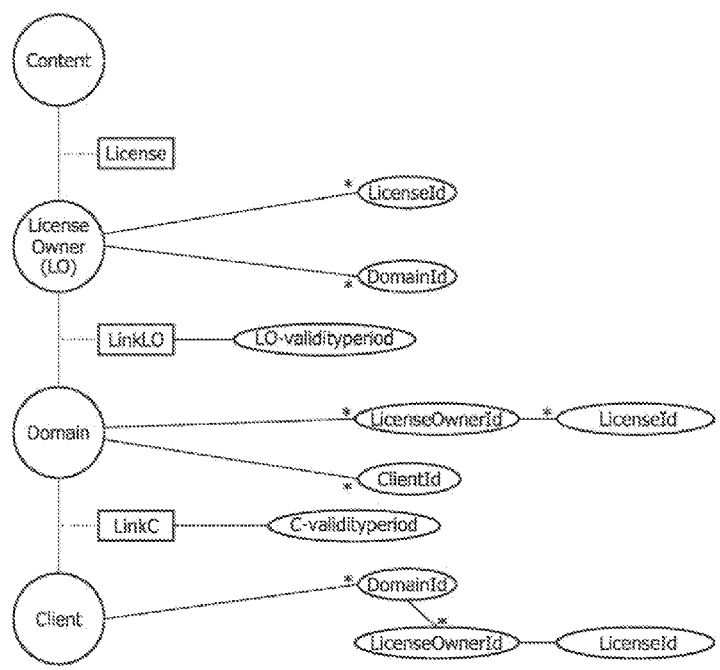

FIG. 8 schematically illustrates a state mechanism in which and Individual State for a Relation is used for guarding the state of LinkC, LinkLO and License, and in which Validity Periods for a Link are used for Guarding LinkC and LinkLO, enforcing information exchange between License Owner and Domain and enforcing Domain configuration information exchange between Client and Domain.

Figure 9:
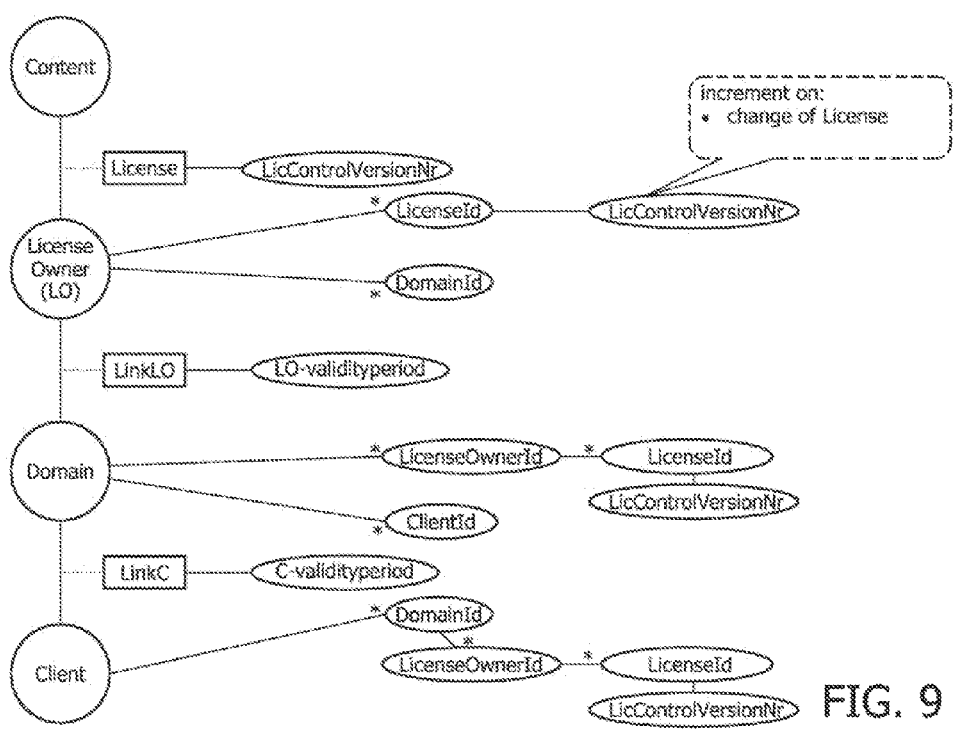

FIG. 9 schematically illustrates a state mechanism in which the individual State for a Relation is used for Guarding the state of LinkC, LinkLO and License, and in which Validity Periods for a Link are used for Guarding LinkC and LinkLO, and enforcing the information exchange between License Owner and Domain and enforcing Domain configuration information exchange between the Client and the Domain, and in which the Version number for a Relation by State is used for Guarding the state of the versions of a License.

Figure 10:
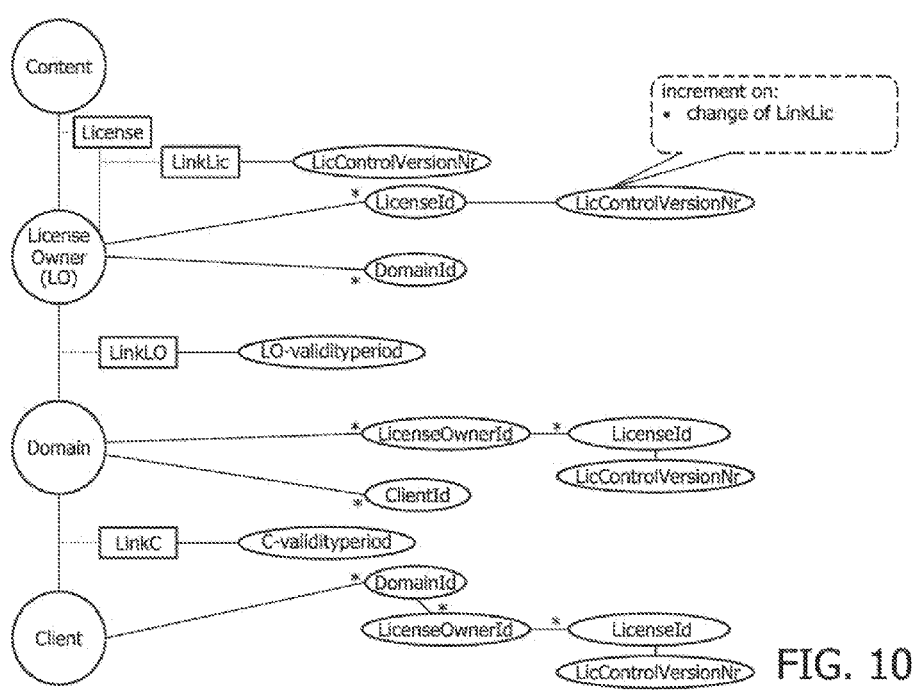

FIG. 10 schematically illustrates a state mechanism in which an Individual State for a Relation is used for Guarding a state of LinkC, LinkLO and License, and in which Validity Periods for a Link is used for Guarding LinkC and LinkLO, enforcing information exchange between License Owner and Domain and enforcing Domain configuration information exchange between Client and Domain, and in which a Version number for a Relation by State is used for Guarding a state of versions of a LinkLic, and in which a Parallel License Linking for separation of areas of control is used for Isolating user-defined restrictions in the Control of the LinkLic.

Figure 11:
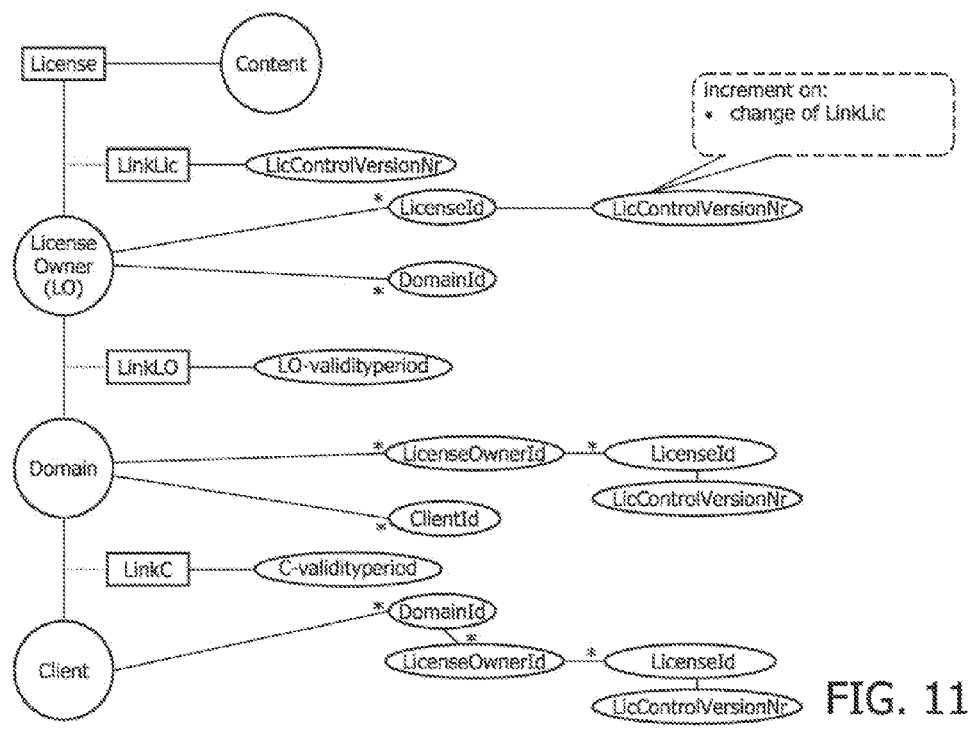

FIG. 11 schematically illustrates a state mechanism in which an Individual State for a Relation is used for Guarding a state of LinkC, LinkLO and a License, and in which Validity Periods for a Link are used for Guarding LinkC and LinkLO, enforcing information exchange between License Owner and Domain and enforcing Domain configuration information exchange between Client and Domain, and in which a Version number for a Relation by State is used for Guarding a state of versions of a LinkLic, and in which a Serial License Linking for separation of areas of control is used for Isolating user-defined restrictions in the Control of the LinkLic.

FIG. 1 schematically illustrates such an authorization chain from Client to Content where every relationship can have a multiplicity greater then 1 in each direction, as indicated by the symbol '*'. The relations between the entities Client, Domain, License Owner and Content in a Domain configuration can be expressed in- and qualified by an attest, sometimes also referred to as (digital) certificate. The following attests may be used:

The right a specific License Owner has on a piece of Content is expressed in a License referencing the License Owner as well as the piece of Content involved. A License is typically realized as a digitally signed object comprising the relevant information in a machine-readable format. Such a License also includes the specific permissions and restricting rules expressed in executable Control code, stored in a so called Control object in the License, to be evaluated at the moment access to the Content is desired (Note that permissions and restrictions might also be represented by a by formal rights language like e.g. XrML). A permission, in a positive granting model as we use here, is an individual right, e.g. "Play" or "Copy", which can be limited by one or more restrictions, e.g. "only 10 times" or "not before 20:00 pm" or "only on a Saturday". A restriction used in combination with a permission provides a condition that limits the use of a permission. Every permission can have different restrictions. Note that each License has its own set of permissions and restrictions for those permissions (in a Control). The original content service provider defines the permissions, possibly extended with a number of restrictions, in a License. The user of the system, a consumer, might desire to add further limiting restrictions to the License for usage in "his" Domain. The original content service provider does not set for example parental control restrictions, but the License Owner that releases his acquired Content to a Domain might want to do so. As an example a License Owner defines for a number of Content items that they should not be accessible before 22:00 pm, or that the Content items are not accessible without some proper authentication of the user operating a Client. This leads to different areas of control: one for the service provider and one for the License Owner (user) with slightly different characteristics. It is unlikely that the service provider settings will change; the License will be revoked entirely when needed, resulting in a requirement for revocation of Licenses. A License Owner (user) on the other hand might want to change his previously defined restrictions, resulting in a requirement to be able to propagate changes of the License into the system.

The association relation between a License Owner and a Domain is expressed in a directed Link—called LinkLO—from the Domain to the License Owner. Such a Link can contain restricting rules expressed in executable Control code, stored in a so called Control object in the Link, qualifying the validity of the Link, which must be evaluated at the moment the Link is to be used. Such a Link is preferably created using a digitally signed object in which the Domain and the License Owner are identified.

The membership relation between a Client and a Domain is expressed in a directed Link—called LinkC—from the Client to the Domain. Such a Link can contain restricting rules expressed in executable Control code, stored in a so called Control object in the Link, qualifying the validity of the Link, which must be evaluated at the moment the Link is to be used. Such a Link is preferably created using a digitally signed object in which the Client and the Domain are identified.

Attributes can be added to Licenses as well as to Links to support validity evaluation and for information transport purposes.

Each Client that is a member of a Domain may access (a copy of) the Content and the attests comprising the Domain configuration at a certain moment in time, e.g. by downloading such Content and attests as needed, although some or all of this data may also be broadcasted or distributed otherwise.

When a Client intends to access a piece of Content, it will evaluate the License for that Content, checking permissions and restrictions defined in that License. To this end the Client is provided with a license evaluation module that may be realized as a secure chip and/or software component, for instance on a smart card.

In every License there is the restriction that, using the different Links available to the Client, a valid path (chain of Links) from the evaluating Client to the License Owner must be present. During this path-evaluation, any restriction, being a condition limiting the validity of the Link, present in the Links composing the path must also be evaluated. As a result, a piece of Content can only be accessed when a path of attests is found between the evaluating Client and the piece of Content while all the conditions in every attest are met. If this path is found, the license evaluation module will enable a content access module to access the Content in the manner requested. Subsequently the Content can be rendered, copied and/or distributed in accordance with the Usage Rules.

This system works well for granting rights to Clients based on the Domain configuration. Changing- or entirely taking away previous granted rights for Clients in an established configuration of relations requires relations and their associated attests to be invalidated to preserve consistency in the system. The entities in the chain may be deployed on different devices that need not be connected to each other at all times. An unconnected Client cannot simply be "told" that an attest is not valid anymore. Another problem with an attest is that even when it where deleted on a Client, another copy of the attest could (re) appear on that Client from another host in the system or from a backup system. This gives an opening for malicious users to gain access to Content on a Client they are not entitled to.

Given the fact that revocation of attests in the system by deleting all instances (copies) of the attests to be revoked is not feasible, other ways of revocation are needed to be able to reduce rights a Client has for Content.

In brief, in a system such as described above, access to a piece of content is granted in accordance with a license owned by a license owner to a client who is a member of a domain. This requires successfully verifying that a membership relation exists between the client and the domain as reflected in a first state variable maintained both by the client and by a controller of the domain, and that an association relation exists between the license owner and the domain as reflected in a second state variable maintained both by the controller of the domain and by a license owner controller associated with the license owner.

These two verification steps prove membership of the client to the domain, and association of the license owner, and hence also his licenses, with the domain. As a result the access to the content may be granted. The relation between two parties is preferably expressed in an attest in which the two parties are identified. The existence of such an attest, typically digitally signed by a trusted party, then is used in the verification of the relationship.

Disabling the possibility to access, in such a Domain, a specific piece of Content can be arranged with a restriction in the License or by communicating the validity of the License to a Client. Disabling the possibility to access, in such a Domain, any Content of a specific License Owner can be arranged with a restriction in the Domain→License Owner Link (LinkLO) or by communicating the validity of the Link towards the Client. To disable a single Client from accessing any Domain Content a similar operation for the Device→Domain Link (LinkC) can be performed.

It is beneficial for the system when it is possible to transport attests to a Client providing new information about the Domain configuration that can be used instantly for Content access without the need for online protocols between parties. One application is, when a new License Owner is associated with the Domain, expressed in a LinkLO, and he releases Content to the Domain, expressed in Licenses, transport of these attest along with the Content to an unconnected Client using some media enables the Client to access the Content without needing to connect to another party.

Another even more desirable application is when an existing associated License Owner acquires Content and releases it to the Domain; the License can be transported along with the Content to an unconnected Client using some media enabling the Client to access the Content without needing to connect to another party.

A commonly used restriction for attests in such a situation is the definition of a validity period; after the validity period the attest is disabled on its own. In case of validity periods in Links, a Client that has not been in contact with the Link issuers in the system, to refresh its Links will eventually not be able to access Content anymore. A validity period in a License will result in time, when not reissued, in an ending of the possibility to access a specific piece of Content on a Client.

Drawbacks associated with validity periods in attests are:
1. Attests must be updated on a regular basis to reconfirm validity requiring online issuers, generating network traffic and requiring generation and signing of updated attests;
2. Not all attests on a Client will time-out on a Client at the same time giving an undesired user experience especially when Licenses time-out at different moments;
3. To preserve consistency in a system, waiting times must be introduced for some operations to be sure that the validity period of issued attests has elapsed;
4. Clients will not be able to access Content when unconnected for a long time (>validity period) while nothing has changed in the Domain configuration.

One of the problems with the above is how to reliably revoke or disable a Link and hence a relationship. Deleting an attest revokes the relationship, but if an attest can be copied and distributed, then a person with malicious intent can simply copy the attest beforehand and restore it after it has been deleted. Storing and managing attests in secure memory is an option but secure memory is expensive, especially when dealing with a large number of attests.

It is an object of the invention to provide a more efficient means of revoking the membership relation and the association relation.

This is achieved by a method comprising:
revoking the membership relation by executing an online protocol between the controller of the domain and the client after which both remove the first state variable, and
revoking the association relation by executing an online protocol between the license owner controller and the controller of the domain after which the controller of the domain removes the second state variable and after which the state administration relating to the domain is propagated to the client so that the second state variable is removed by the client.

Generally speaking, the invention solves this problem by having the parties identified in the link maintain state regarding their relations, so that they can simply remove the state variable to revoke the link. The client is e.g. a device configured to access and play content, and needs to be a member of a domain to be able to access domain content. The domain is managed by a domain controller, which typically is a central device in a home network (although many other configurations are of course also possible).

The license owner is an entity representative of the user whose content is available to devices in 'his' domain. This requires an association relation between the license owner and the domain. The license owner's side of the association is taken care of by a controller device, which could be realized e.g. as a smart card owned by the user or as a server provided by a third party for example over the Internet.

The controller of the domain and the client maintain respective state variables regarding the membership of the client in the domain. The presence of a valid state variable is required to successfully verify that the membership relationship exists. When both entities delete these state variables (after agreeing to do so in an online protocol), the relationship can no longer be verified.

The same holds true for the association relation, although here the domain controller also needs to propagate the state administration relating to the domain to the client, so that the client can update its state administration and remove the state variable reflecting the association relation.

In an embodiment the verification of the association relation and the membership relation comprises evaluating a validity period of the relation in question as expressed by the state information and successfully verifying the association in question only if the validity period has not expired. It is advantageous to have time-based expiration of validity. By expressing this using the state information, the validity period can be easily checked.

In a further embodiment the domain controller and the client maintain a third state variable to guard the state of the license. This advantageously uses the mechanism of the invention also for the licenses and not only for the membership and association relations. This embodiment permits the invalidation of licenses by removing the third state variable. This prevents the restoration of expired or otherwise invalidated licenses by restoring a copy since the state variable cannot be manipulated in this way. There now also is no need to restrict the copying of licenses, since they will only be accepted by a party who has a valid third state variable.

Preferably in this embodiment the controller of the license owner creates the third state variable and propagates the third state variable to the domain controller who propogates the third state variable to the client. This advantageously requires that only the license owner controller be enabled to create the third state variable, as the others can simply receive it (directly or indirectly) from this controller. As the controller of the license owner is preferably implemented as a secure module, e.g. a smart card, anyway, no special measures need to be taken to protect the creation of the state variables.

The invention may find application in areas such as Authorized Domain systems for IT and CE devices, content protection systems in environments with possibly disconnected devices and community systems with asset sharing for consumer devices.

FIG. 2 schematically illustrates an exemplary system 100 comprising devices 101-105 and persons 130, 131 forming an authorized domain (AD). The system 100, which aims to represent a typical digital home network, includes a number of devices, e.g. a radio receiver, a tuner/decoder, a CD player, a pair of speakers, a television, a VCR, a digital recorder, a mobile phone, a tape deck, a personal computer, a personal digital assistant, a portable display unit, and so on. These devices are interconnected over network 110 to allow one device, e.g. the television, to control another, e.g. the VCR. One device, such as e.g. the tuner/decoder or a set top box (STB), is usually the central device, providing central control over the others.

Content, which typically comprises things like music, songs, movies, TV programs, pictures, games, books and the likes, but which also may include interactive services, is received through a residential gateway or set top box 101. Content could also enter the home via other sources, such as storage media like discs or using portable devices. The source could be a connection to a broadband cable network, an Internet connection, a satellite downlink and so on. The content can then be transferred over the network 110 to a sink for rendering. A sink can be, for instance, the television display 102, the portable display device 103, the mobile phone 104 and/or the audio playback device 105.

The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

The set top box 101, or any other device in the system 100, may comprise a storage medium S1 such as a suitably large hard disk, allowing the recording and later playback of received content. The storage medium S1 could be a Personal Digital Recorder (PDR) of some kind, for example a DVD+RW recorder, to which the set top box 101 is connected. Content can also enter the system 100 stored on a carrier 120 such as a Compact Disc (CD) or Digital Versatile Disc (DVD).

The portable display device 103 and the mobile phone 104 are connected wirelessly to the network 110 using a wireless access point 111, for example using Bluetooth or IEEE 802.11b/g. The other devices are connected using a conventional wired connection. To allow the devices 101-105 to interact, several interoperability standards are available, which allow different devices to exchange messages and information and to control each other. One well-known standard is Universal Plug and Play (http://www.upnp.org).

In one exemplary scenario, at least one of the users 130, 131 is bound to the Authorized Domain in addition to one or more of the devices 101-105. Optionally a number of content items (not shown) may also be bound to the Authorized Domain. This binding of users and/or content may be done in the manner disclosed in international patent application WO 04/038568, in the manner disclosed in international patent application WO 2005/010879, or in the manner described in international patent application serial number IB2005/050910.

It is often important to ensure that the devices 101-105 in the home network do not make unauthorized copies of the content. To do this, a security framework, typically referred to as a Digital Rights Management (DRM) system is necessary. One way of protecting content in the form of digital data is to ensure that content will only be transferred between devices 101-105 if the receiving device has been authenticated as being a compliant device, and the user of the content has the right to transfer (move and/or copy) that content to another device.

If transfer of content is allowed, this will typically be performed in an encrypted way to make sure that the content cannot be captured illegally in a useful format from the transport channel, such as a bus between a CD-ROM drive and a personal computer (host).

AD Member Authentication

Content protection systems, especially those set up as some form of Authorized Domain, normally involve protected communication between members based on some secret, only known to devices that were tested and certified to have secure implementations. Knowledge of the secret is tested using an authentication protocol. Commonly these protocols employ public key cryptography, which use a pair of two different keys. The secret to be tested is then the secret key (sometimes called private key) of the pair, while the public key can be used to verify the results of the test.

To ensure the correctness of the public key and to check whether the key-pair is a legitimate pair of a certified device, the public key is accompanied by a certificate, which is digitally signed by a Certification Authority (CA), the organization that manages the distribution of public/private key-pairs for all devices. Everybody knows the CA's public key and can use it to verify the CA's signature on the certificate. In a simple implementation the public key of the CA is hard-coded into the implementation of the device.

To enable the above each client holds a number of secret keys. These keys and the control flow using these keys should be well protected, for knowledge of these keys or manipulation of the control flow would allow hackers to circumvent the content protection systems.

The control flow determines whether access to a piece of content should be granted to a Member Client. The result of the control flow is a decision whether Content may be accessed or not. Of course such access should be in accordance with the applicable License for the Content, which License is owned by the License Owner. Information for that decision consists of the presence of the relations between the system entities.

Evaluating the control flow then involves verifying that a membership relation exists between the client and the domain and that and that an association relation exists between the license owner and the domain. This verification involves the evaluation of attests called Links as well as the verification of state variables that reflect the validity of these attests.

The client, e.g. any of the devices 102-105, and the domain controller, e.g. the set-top box 101, both maintain a first state variable that reflects the membership relationship of the client to the Domain. Similarly, the domain controller and a license owner controller associated with the license owner both maintain a second state variable that reflects the association relation between the license owner and the domain. The license owner controller is e.g. as smart card owned by the user represented by the License Owner.

In some embodiments the domain controller and the client maintain a third state variable that guards the state of the license. In such embodiments the license owner controller creates this third state variable and propagates it to the domain controller who propogates the third state variable to the client.

A Domain controller manages and services multiple (zero, one or more) Domains. A Domain however can only be managed by a single Domain controller. This controller is responsible for issuing attests regarding membership relations of Clients to the Domains it manages. The controller may be located on an embedded as well as an open platform. The authorization to create, remove and control the composition of a Domain may be subject to certain rules or restrictions imposed by a domain policy.

A license owner controller manages and services multiple (zero, one or more) License Owners. A License Owner however can only be managed by a single license owner controller. This controller is responsible for issuing attests regarding association relations between the Domain and License Owners and for distributing these links and related state variables to Domain controllers. The controller may be located on an embedded as well as an open platform. A license owner controller may be granted authorization to associate and disassociate License Owners with/from Domains, acquire Licenses, Import content into the AD, share acquired- or imported Content with a Domain or an individual Client. This authorization may be subject to certain rules or restrictions imposed by a domain policy.

Note that the various entities, such as Client, Domain controller and license owner controller may be implemented as hardware and/or software modules in a single device. The set-top box 101 for instance has been described above as a Domain controller, but of course it can also operate as a Client when it needs to access certain content.

Exactly where each entity is implemented depends on the desired business model that this technical system is to support, as well as security considerations, technical constraints regarding the available devices, and so on. In one straightforward embodiment the Clients are realized on end-user devices such as mobile phones or portable music players, and the Domain controller and license owner controller are deployed on a central server available through the Internet. This provides the operator of this server with the fullest control over Domains and content delivery.

In another embodiment the Domain controller and the license owner controller are both realized in a (central) device in the home, e.g. the set-top box 101. Optionally the two controllers may be realized as two separate devices. The other devices 102-105 in the home operate as Clients. In this scenario Content, once acquired, is under the control of the user, of course within the limits set by the License and any restrictions imposed by the links in the AD.

In yet another embodiment the license owner controller is provided on a first Internet server and the Domain controller is realized in a (central) device in the home. The reverse is also possible. The license owner controller may be realized on a smart card, although depending on the required functionality this is not always practical. A smart card can also be used to authorize or identify a User so that the appropriate License Owner is used.

The mechanisms on which the invention relies will be elaborated on in section 1 as they will be applied in different combinations. Which combination of mechanisms to use depends on the estimation a system designer makes for balancing complexity, computational resources, (secure) storage capacity and availability requirements for the system.

The described embodiments in section 2 are not exhaustive; other combinations of the presented mechanisms will also be beneficial.

1. Mechanisms Used in this Invention
1.1 Individual State for Relation

By entities in the chain of authorization a secure administration of state of relations is maintained. State values are exchanged between parties (entities) in secure online protocols. This administration determines whether the relation exists or not and optionally the relation definition is extended with a version number to support change detection. The attests (Licenses and Links) also express the same relations. The securely managed state information can now be used to determine the existence of a relation and with that the validity of any attests for the same relation. When this mechanism is used to guard the validity of an attest, the Control code in the attest will be extended with a check whether the relation, the attest claims to represent, is administered as existing and valid in the state administration of the evaluating entity (typically a Client). Any other condition, like a validity period, set in an attest will still be evaluated. All conditions including the state check must be met before the attest is accepted as valid. Eliminating the relation in the state administrations of the different entities can now revoke a relation in the system.

The simplest form of state is only the administration of the own relation(s) of the entity with neighbours in the chain. Both parties (entities) together can decide in an online protocol to break their relation, which is instantly reflected in both their administrations invalidating all attest for that relation for both parties involved. Other parties (entities) in the chain will be informed later of this state change and will still regard the attest as valid. Validity periods can be indicated in the state information to force proliferation of updated state information. The state mechanism can be used for revocation. Creation of a new relation will involve generation of an attest as well as creation of a state variable that must be communicated using secure online protocols. An attest can be transported in any suitable way.

The most trivial case for the individual state mechanism is the membership relation of a Client with a Domain where the Client is a party in the revocation protocol and is also the evaluator of the attests. When the Client and the Domain agree in an online protocol to break up their relation, this is reflected in the state administration of the Client. The Client will immediately disqualify any attest for the relation and no Domain related Content is accessible anymore on the Client. In the more general case, where the evaluator (Client) does not participate in the protocol when a relation is broken, there is the latency problem of communicating the state change to the evaluator.

1.2 Validity Periods for Link

The Control code in the Link will verify that the validity period of the Links is not expired. When expired, the Link is regarded as invalid. Parties using Links, apart from an optional additional state mechanism, for determining whether a relation in the chain exists will be urged to contact other parties in the chain to receive a renewal of the Link with an extended validity period and optionally receive state information updates.

1.3 Proliferation of Domain Links Attached to Licenses to Unconnected Clients

When the validity of a Link in a Domain is not guarded by individual state for the relation, the Link (attest) on its own can provide validity proof. Such Links, each describing a part of the Domain configuration, can be attached to Licenses when they are issued. It is beneficial for the system when this potentially new information about the Domain configuration arrives at a Client and can be used instantly for Content access without the need for online protocols between parties. This mechanism can for example be used for attaching the LinkLO for a License Owner to the Licenses issued by that License Owner.

When the Client already has the Link or a newer version of the Link, the information is not used. In one package a Client can receive the License for a piece of Content and the Link of the issuing License Owner with the Domain. This License package can accompany the Content itself on some media enabling the Client to access the Content without needing to connect any other party in the system. When none of the Links in the domain configuration is guarded by individual state for the relation, all the Links can be attached to a License providing the entire set of attests needed to access the related Content.

This mechanism will not operate when mechanism 1.1—"Individual State for Relation" is used for the Link, but it can work together with the mechanisms 1.4—"Configuration number for Relations by State" and 1.5—"Configuration number for Relations by Links".

1.4 Configuration Number for Relations by State

In the state mechanism 1.1—Individual State for Relation, a state value represents a single relation. A Configuration number represents an explicit collection of relations that are treated equally with respect to revocation. Only when a relation is removed from the collection the Configuration number is incremented indicating that not all relations previously part of the collection are still valid. Adding a new relation to the collection will not increment the number because we are only interested in revocation. The attests of the involved relations are attributed with the actual value of the Configuration number at the moment that they are issued and in their Control code a condition is added stating that the value of the Configuration number of the attest is equal to- or greater than the value of the Configuration number in the state administration of the evaluating entity (typically Client). When this condition is not met, the relation is regarded as invalid.

This mechanism does not require state updates in the system when adding a new relation; communicating of attests only will suffice to effectively introduce new relations. A drawback of this mechanism is that when only one relation is to be revoked, all other relations in the collection must be reconfirmed by a renewal of their attests with the new incremented Configuration number as attribute. Proliferation of changed state information is similar as with the state mechanism for individual relations.

This mechanism can be used in cascade for the different levels of relations in the chain of authorization, optionally in combination with the mechanism 1.5—"Configuration number for Relations by Links" mechanism.

1.5 Configuration Number for Relations by Links

The definition of the Configuration number and rules for adding and removing relations to- and from the implicit collection are the same as described for mechanism 1.4—"Configuration number for Relations by State". The differences are in the proliferation of the actual Configuration number in the chain towards the Client entity and in the way attests of the involved relations are tested for validity. The attests of the involved relations are attributed with the actual value of the Configuration number at the moment that they are issued, but the condition for validity checking is not added to their Control. The actual value of the Configuration number is added as an attribute to the Link that is next in line of the authorization chain in the direction towards the Client.

The condition for checking the Configuration number attributed to the attest of the involved relations against the actual value of the Configuration number is added to the Control code of the Link. This Link will reach the Clients in time, forced by the validity period set for the Link. During evaluation on a Client of the path to the License Owner a License is targeted to, the Link will be evaluated and the Configuration number value in the Link will be compared with the one in the attest of the involved relation (typically the License). The number of the attest must be equal to- or greater than the value of the number in the Link. Note that this mechanism does not suffer from the disability to introduce relations on the Clients by attests without the client being connected, because there is no state operation involved.

This mechanism can be used in cascade for the different levels of relations in the chain of authorization, optionally in combination with the mechanism 1.4—"Configuration number for Relations by State" mechanism.

1.6 Version number for Relation by State

Some relations, typically the ones between Content and License Owner do not only need to be revoked entirely, but do need to be adapted. This is the case, e.g. when for an existing License the user-defined restrictions must be changed. To support version control (revocation of previous versions) a Version number is introduced. This Version number that is incremented when an essential change takes place in the relation.

The current value of the Version number must be communicated to Clients to check the version condition. Attributing the state for the relation with the actual value of the Version number does this and this combination will be transported to the evaluating Client via the chain of entities using online secure protocols as already described for the other state mechanisms.

The attest of the involved relation is attributed with the actual value of the Version number at the moment that it is issued and in its Control code a condition is added stating that the value of the Version number of the attest is equal to- or greater than the value of the Version number of the relation in the state administration of the evaluating entity (typically Client).

A prerequisite for this mechanism is the usage of the mechanism 1.1—"Individual State for Relation" mechanism for the version-controlled relation.

1.7 Version Number for Relation by Links

The definition of the Version number and rules for changing relations are the same as described for mechanism 1.6—"Version number for Relation by State". The differences are in the proliferation of the actual Version number in the chain towards the Client entity and in the way attests of the involved relations are tested for validity.

The attest of the involved relation is attributed with the actual value of the Version number at the moment that it is issued, but the condition for validity checking is not added to its Control. The actual value of the Version number and the identification of the involved relation are added as an attribute to the Link that is next in line of the authorization chain in the direction towards the Client. Note that this Link will potentially contain an entire list of relation-Version number combinations—one for each relation one level higher up in the chain of authorization.

The condition for checking the Version number attributed to the attest of the involved relations against the actual value of the Version number is added to the Control code of the Link. This Link will reach the Clients in time, forced by the validity period set for the Link. During evaluation on a Client of the path to the License Owner a License is targeted to, the Link will be evaluated and the Version number value for the relation under evaluation in the Link will be compared with the one in the attest of the involved relation (typically the License). Note that this mechanism does not suffer from the disability to introduce relations on the Clients by attests without the client being connected, because there is no state operation involved.

1.8 Parallel License Linking for Separation of Areas of Control

In the basic concept a valid path to the License Owner must be proved and the permissions and restrictions in the License, targeted to the License Owner, must be met. Additional user-defined restriction must, in this concept, be added to the Control in the License. Using parallel License linking these user-defined restrictions are separated from the restrictions set in the Control of the License. The License targeting a License Owner is explicitly linked with a "new" link LinkLic from the License Owner to the License when the License is acquired. Note that the LinkLic does not need to deal with the multiplicity of the Content—License relationship, as a License must.

The check in the License will now become that a valid path (chain of Links) from the evaluating Client to the License must be present. When for security reasons the specific License Owner being present in the path to the License must be checked, also the original check for a valid path from the evaluating Client to the License Owner can be added. The user-defined restrictions are now added to the Control code in the LinkLic instead of the Control of the License. As a result the Control of a License need not be changed when a user wants to add or change user-defined restrictions separating the areas of control and solving the security issues that arise when all restrictions are combined in a single Control.

Revocation of the Content—License Owner relation can be done with one or a combination of the available revocation mechanisms. Note that there are now 2 attests (License and LinkLic) for the single relation. Both of these parallel attest must be available and valid to be able to access Content on a Client. When one of the attests is disabled, the relation is revoked. Version control, typically required for user-defined restrictions, can now selectively be applied to the LinkLic containing the user-defined restrictions.

1.9 Serial License Linking for Separation of Areas of Control

In the basic concept a valid path to the License Owner must be proved and the permissions and restrictions in the License, targeted to the License Owner, must be met. Additional user-defined restriction must, in this concept, be added to the Control in the License. Using serial License linking these user-defined restrictions are separated from the restrictions set in the Control of the License. The License no longer targets a License Owner; it just only references the Content item(s) and contains the permissions and restrictions as set by the original content service provider. The License does not represent the full relation between the Content and the License Owner anymore. The relation with the License Owner is established and represented by a "new" link LinkLic from the License Owner to the License when the License Owner is granted access to the Content. Note that the LinkLic does not need to deal with the multiplicity of the Content—License relationship; this is still done by the License. The check in the License will now become that a valid path (chain of Links) from the evaluating Client to the License must be present. The user-defined restrictions are now added to the Control code in the LinkLic instead of the Control of the License. As a result the Control of a License need not be changed when a user wants to add or change user-defined restrictions separating the areas of control and solving the security issues that arise when all restrictions are combined in a single Control.

Revocation of the Content—License Owner relation can be done with one or a combination of the available revocation mechanisms acting on the LinkLic attest.

Note that there are now 2 attests (License and LinkLic) required for the single relation where the License handles the Content part of the relation and the LinkLic handles the License Owner part the relation. Both of these serial attest must be available and valid to be able to access Content on a Client. When one of the attests is disabled, the relation is revoked. Version control, typically required for user-defined restrictions, can now selectively be applied to the LinkLic containing the user-defined restrictions.

In previous solutions, Content was targeted to a License Owner in a License, to be more specific in the Control code of the License with the check that the License Owner must be reachable via a path of Links. In a solution with this mechanism, the License Owner coupling is done in the LinkLic. Granting access rights to a specific License Owner is not embedded in the License. When the rights are to be moved to another License Owner then the Control in the License need not be changed; the new License Owner can reuse it. The new License Owner has to establish a new LinkLic referencing himself in cooperation with the old License Owner that has to revoke the existing relation (LinkLic).

1.10 License Redefinition for Separation of Areas of Control

With the mechanisms 1.8—Parallel License Linking for separation of areas of control and 1.9—Serial License Linking for separation of areas of control methods are described to separate areas of control using the existing elements License and Link. An alternative for this approach is the definition of a new element that combines the described behaviour of the License and LinkLic. Since the License and LinkLic always appear in combination, this new element can be a substitution for the combination of other two. This alternative can also be presented as a redefinition of the License element supporting two Controls internally with two different areas of control; one to contain the permissions and restrictions as set by the original content service provider and one for the restrictions that can be added by a user. In this case the original check that a valid path of Links to the License Owner must exist, will be used. This alternative encompasses both mechanisms because the parallel as well as the serial pattern can be replaced by a single new element.

2. Preferred Embodiments

The presented embodiments use the following starting points:

Having no validity periods on individual Licenses;

Usage of Links is required;

Attest can be provided to Clients from any source, but typically Licenses will be provided by a License Owner and the Domain links LinkC and LinkLO are provided by the Domain;

Validity state of attests is transported in online protocols between parties strictly according the authorization chain.

Using validity periods on the Links, where the validity period for LinkLO is assumed to be, but not necessarily is, larger than the one for LinkC.

Note that the mechanisms can also be used in other Domain configurations than the one presented here; typically in all configurations with more than 2 distributed entities with a chain of dependencies.

The mechanisms can also be used in embodiments that do not use the above-mentioned choices. For example:

Solutions with a validity period defined for Licenses that are released to the Domain are fairly easy to define given the provided mechanisms but suffer a lot from the drawbacks discussed above under the Summary of the invention. However, in situations where the number of Licenses is low or where resources are not limiting, validity periods applied for Licenses can be beneficial;

When relations are guarded by individual state, Links can be eliminated entirely or at least reduced in functionality by moving some or all attributes of Links, as used in the presented solutions, into the state administrations of the entities;

When the License Owner instead of the Domain issues the LinkLO, some of the solutions where information is added to a LinkLO must be slightly adapted to enable the flow of information to the entity that issues the link.

The embodiments presented are illustrated in figures using the following notational conventions:

The entities in the authorization chain are indicated by a circle and can be attributed with multiple nested state variables (ids, configuration numbers, validity periods) indicated by ovals. These attributes are managed securely by the entities;

The solid lines between the entities in the authorization chain represent the relationships between them; the other solid lines indicate attribute associations;

The dotted lines indicate the attest representation of the relations;

Multiplicity for attributes is indicated with a '*', while the multiplicity for the relationships is not indicated in the figures;

Attests representing a relation are indicated by a rectangle and can be attributed with multiple (state) variables (ids, configuration numbers, validity periods) indicated by ovals. These attributes are securely coupled to the attests.

A License can be attributed with links (coupling LinkC(s) and LinkLO(s) to a License). These link attributes are informational and need not be coupled securely to the attests.

These coupled links (copies) carry the same information (attributes) as the issued links representing the corresponding relations. The attributes however are now shown in the figures.

Attests (copies) that are/must be present, but must not necessarily be securely managed, on the hosts of the entities are not indicated in the figures.

The ClientId, DomainId, LicenseOwnerId and LicenseId are used as state variables to reference their corresponding entity but in the figures they are not shown as an attribute of those entities.

2.1 No Enforcement by Validity Periods

This embodiment is illustrated in FIG. 3. The mechanisms applied are:

| Mechanism | Used for |
|---|---|
| 1.3 - Proliferation of Domain Links attached to Licenses to unconnected Clients | Communicating all LinkLOs and LinkCs in the Domain configuration to Clients. |
| 1.5 - Configuration number for Relations by Links | Guarding state of LinkC, LinkLO and all Licenses of a License Owner. (2 times in cascade) |

A License Owner has a licenseConfigNr that is incremented when any of the Licenses targeted to that License Owner is changed or is removed indicating a change for one of the Licenses.

This licenseConfigNr must be communicated in a protocol to the Domain that securely manages the most recent licenseConfigNr for each associated License Owner. The Domain manages a domainConfigNr that is incremented when any of the relations in the Domain configuration changes. These changes are: an increment of the licenseConfigNr of any of the License Owners associated with the Domain, a change or removal of any of the associations of License Owners with the Domain, and a change or removal of any of the memberships of Clients with the Domain.

The current value of the domainConfigNr is associated with the LinkC and the LinkLO by the Domain and to Licenses newly released to a Domain by the License Owner, for example by recording this value in the signed object representing the LinkC and LinkLO.

The domainConfigNr must first be communicated in a protocol to the License Owner that securely manages the most recent domainConfigNr for each associated Domain to be able to issue a new License with an updated domainConfigNr.

After an increment of the licenseConfigNr in the License Owner the License Owner needs to wait for communication with the Domain to receive the most recent domainConfigNr, along with the most recent Links of the Domain, before new Licenses can be issued.

All LinkLOs and all the LinkCs, as known by the License Owner, are attached to a License when released to a Domain. The License Owner receives these links in a protocol with the Domain.

The links of a Domain can now reach a Client by direct communication between the Domain and the Client or via a License acquired by the Client. A Client manages per Domain it is member of a state variable for the most recent domainConfigNr known by the Client. This domainConfigNr indicates validity for Links and Licenses. When one of these attests carry a domainConfigNr as attribute that has a lower value than the one managed securely by the Client the attest is regarded as invalid and must be renewed when possible. This check is performed by code in the Control of the Links during path evaluation, requiring that the values of the domainConfigNr in the License under evaluation and the domainConfigNr in the Link under evaluation must not be lower than the one managed by the Client.

The Client will adapt its domainConfigNr, only incrementing it, when a higher value is encountered in a Link sent by the Domain or in a License. All relations can be revoked in the system by the domainConfigNr mechanism, but there is no enforcement for Clients to contact a Domain or interpret a new License. The only incentive for a Client to accept this revocation information when it desires to access Content for which a License is issued after the revocation has taken place in the system.

A License Owner attributes a License with the domainConfigNr known in the administration of the License Owner. There is however no incentive for a License Owner to contact a Domain to receive new Domain configuration information except for the case where the licenseConfigNr was increased and communication is required before Licenses are allowed to be released. As a result the Domain configuration information attached to new released License (LinkLOs, LinkCs and the domainConfigNr) may lag behind the current situation in the Domain configuration as known by the Domain. This can be circumvented by requiring communication of the License Owner with a Domain every time before a License is released to a Domain to be sure to have the most recent Domain configuration information.

This solution does not implement the immediate revocation of attests on a Client, but in time, when Domain Content arrives, a Client will comply.

Features of Solution:

| Aspect/Action | |
|---|---|
| New links to Client with offline Domain and/or License Owner | All Links attached to License proliferated to Client without online Domain or License Owner needed. Never connection between Client and Domain required. |
| Not connecting License Owner | Association relation will be retained forever (after Domain decided to end it) in viewpoint License Owner. In viewpoint Clients, association might end by encountering a License released by another License Owner associated with the Domain with a higher domainConfigNr. There is no guaranteed end to Content access on Clients. |
| Not connecting Client | Membership relation will be retained (after Domain decided to end it) in viewpoint Client until a License is interpreted with higher domainConfigNr. There is no guaranteed end to Content access on Clients. |
| Deregister a Client from a Domain | Immediately Client will not access any Domain Content. All remaining Links must be renewed. |
| Disassociate a License Owner from a Domain | Until Clients contact the Domain or they encounter a License released by another License Owner associated with the Domain with a higher domainConfigNr, Content of the disassociated License Owner will be accessible. All remaining Links must be renewed. |
| Remove a | Until License Owner contacted the Domain and |

-continued

| Aspect/Action | |
|---|---|
| License from a License Owner | subsequently Clients contact the Domain or they encounter a License, released by the removing License Owner or another License Owner associated with the Domain that contacted the Domain after the removal, with a higher domainConfigNr, Content of the removed License will be accessible. All remaining Licenses of all License Owners must be renewed. All Links must be renewed. |
| Change a License (user defined restrictions) | Increment licenseConfigNr as if a License was removed. |
| Size of Client secure state administration | #domains * (DomainId + domainConfigNr) |

2.2 No State on Client

This embodiment is illustrated in FIG. 4. The mechanisms applied are:

| Mechanism | Used for |
|---|---|
| 1.2 - Validity Periods for Link | Guarding LinkC and LinkLO and enforcing propagation of licenseConfigNr. |
| 1.3 - Proliferation of Domain Links attached to Licenses to unconnected Clients | Communicating the LinkLO of the License Owner and all LinkCs in the Domain configuration to Clients. |
| 1.5 - Configuration number for Relations by Links | Guarding state of all Licenses of a License Owner. |

A License Owner has a licenseConfigNr that is incremented when any of the Licenses targeted to that License Owner is changed or is removed indicating a change for one of the Licenses. When a License Owner releases a License to a Domain, the License Owner attributes the License with the current value of the licenseConfigNr. The current value of the licenseConfigNr is also attributed to the LinkLO. This licenseConfigNr should first be communicated in a protocol to the Domain that securely manages the most recent licenseConfigNr for each associated License Owner to be able to issue a new LinkLO with an updated licenseConfigNr. The Control in the LinkLO will, during path evaluation, perform the check of the licenseConfigNr attributed to the License with the one attributed to the LinkLO.

The LinkLO and all the LinkCs, as known by the License Owner, are attached to a License when released to a Domain. The License Owner receives these links in a protocol with the Domain. Since the distribution of Links attached to a License is an optional alternative one on top of the standard distribution from the Domain to the Clients, it is optional whether after an increment of the licenseConfigNr in the License Owner the License Owner needs to wait for communication with the Domain to receive the LinkLO with the updated licenseConfigNr. LinkCs attached to released Licenses may lag behind the current situation in the Domain configuration as known by the Domain.

Note that when the LinkLO is not issued by a Domain, but by a License Owner, the License Owner need not communicate the licenseConfigNr to the Domain and the Domain need not administer the licenseConfigNr. In that case the License Owner issues the LinkLO with the current licenseConfigNr directly.

Clients and License Owners are forced by the validity periods on the LinkLO and LinkC to communicate on a regular basis the reconfirm their relationship with the Domain and to receive updated Domain configuration information. These validity periods are indicated in the figure as LO-validityperiod and C-validityperiod, respectively.

Features of Solution:

| Aspect/Action | |
|---|---|
| New links to Client with offline Domain and/or License Owner | Single LinkLO and all LinkCs attached to License proliferated to Client without online Domain or License Owner needed. |
| Not connecting License Owner | Broken relation and no access to Content after expiration of current LO-validityperiod. |
| Not connecting Client | Broken relations and no access to Content after expiration of current LO-validityperiod per License Owner or C-validityperiod. |
| Deregister a Client from a Domain | Wait until expiration of current C-validityperiod for Domain Content to become accessible. |
| Disassociate a License Owner from a Domain | Wait for the rest of the current LO-validityperiod before Clients will no longer access any Domain Content of the disassociated License Owner. No renewal of Links needed. |
| Remove a License from a License Owner | Wait for the rest of the current LO-validityperiod before Clients will no longer access Content of removed License. All remaining Licenses of License Owner must be renewed. Only LinkLO must be renewed. |
| Change a License (user defined restrictions) | Increment licenseConfigNr as if a License was removed. |
| Size of Client secure state administration | 0 |

2.3 Individual State for LinkC

This embodiment is illustrated in FIG. 5. The mechanisms applied are:

| Mechanism | Used for |
|---|---|
| 1.1 - Individual State for Relation | Guarding state of LinkC. |
| 1.2 - Validity Periods for Link | Guarding LinkC and LinkLO, enforcing propagation of licenseConfigNr and enforcing information exchange between License Owner and Domain and enforcing Domain configuration information exchange between Client and Domain. |
| 1.3 - Proliferation of Domain Links attached to Licenses to unconnected Clients | Communicating the LinkLO for the License Owner to Clients. |
| 1.5 - Configuration number for Relations by Links | Guarding state of all Licenses of a License Owner. |

Note that there is local state between License Owner and Domain, but this does not result in an individual state administered by a Client. The association relation can be revoked in an online protocol between the Domain and the License Owner where they both agree to end the association and each remove the related state variable from their administration.

The licenseConfigNr is used to guard the state of all Licenses of a License

Owner and the validity period on LinkLO guards the validity of LinkLO as described with solution 2.2 No state on Client.

Only LinkLO, as known by the License Owner, is attached to a License when released to a Domain. The License Owner receives this link in a protocol with the Domain. Since the distribution of the LinkLO attached to a License is an optional alternative one on top of the standard distribution from the Domain to the Clients, it is optional whether after an increment of the licenseConfigNr in the License Owner the License Owner needs to wait for communication with the Domain to receive the LinkLO with the updated licenseConfigNr.

Since the membership relation, compared with solution 2.2 No state on Client, is now guarded by an individual state variable in the Client, it has no use adding a LinkC to a License, because the Client that acquires the License can not use the LinkC on its own to establish membership; this can only be done with an online protocol.

The membership relation between a Client and a Domain is determined by the individual state mechanism. Membership can only be established using a protocol between the 2 parties and they both administer this fact in a state variable (DomainId for the Client).

The LinkC is issued with a validity period. The LinkC is now only valid when the validity period is not expired AND the state variable DomainId related to the membership LinkC in the Client is still present. This is checked in the code of the Control of the LinkC when evaluation the LinkC searching for a path the License Owner as required in the License under evaluation. The membership relation can be revoked in an online protocol between the Domain and the Client where they both agree to end the membership and each remove the related state variable from their administration. As a consequence the LinkC is disabled on the Client because there is no related state variable anymore.

The LinkLO is issued with a validity period. The LinkLO is now only valid when the validity period is not expired AND the state variable DomainId related to the membership in the Client is still present. This is checked in the code of the Control of the LinkLO when evaluation the LinkLO searching for a path to the License Owner. The Control in the LinkLO will, during path evaluation, perform the check of the licenseConfigNr attributed to the License with the one attributed to the LinkLO. Note that the DomainId of Domain Links could be derived from their implicit direction administration, but the more robust solution is to attribute every Link for a Domain with the DomainId. This is however not illustrated in the figure.

Features of Solution:

| Aspect/Action | |
|---|---|
| New links to Client with offline Domain and/or License Owner | LinkLO attached to License proliferated to Client without online Domain or License Owner needed. |
| Not connecting License Owner | Broken relation and no access to Content after expiration of current LO-validityperiod. |
| Not connecting Client | Broken relations and no access to Content after expiration of current LO-validityperiod per License Owner or C-validityperiod. |
| Deregister a Client from a Domain | Immediately Client will not access any Domain Content. |
| Disassociate a License Owner from a Domain | Wait for the rest of the current LO-validityperiod before Clients will no longer access any Content of the disassociated License Owner. No renewal of Links needed. |
| Remove a License from a License Owner | Wait for the rest of the current LO-validityperiod before Clients will no longer access Content of removed License. All remaining Licenses of License Owner must be renewed. Only LinkLO must be renewed. |
| Change a License (user defined restrictions) | Increment licenseConfigNr as if a License was removed. |
| Size of Client secure state administration | #domains * DomainId |

2.4 Individual State for LinkC and Domain State for LinkLO

This embodiment is illustrated in FIG. 6. The mechanisms applied are:

| Mechanism | Used for |
|---|---|
| 1.1 - Individual State for Relation | Guarding state of LinkC. |
| 1.2 - Validity Periods for Link | Guarding LinkC and LinkLO, enforcing propagation of licenseConfigNr and enforcing information exchange between License Owner and Domain and enforcing Domain configuration information exchange between Client and Domain. |
| 1.3 - Proliferation of Domain Links attached to Licenses to unconnected Clients | Communicating the LinkLO for the License Owner to Clients. |
| 1.4 - Configuration number for Relations by State | Guarding state of LinkLO and LinkC by domainConfigNr. |
| 1.5 - Configuration number for Relations by Links | Guarding state of all Licenses of a License Owner. |

Note that there is local state between License Owner and Domain, but this does not result in an individual state administered by a Client; only in the combined domainConfigNr state. The association relation can be revoked in an online protocol between the Domain and the License Owner where they both agree to end the association and each remove the related state variable from their administration.

A License Owner has a licenseConfigNr that is incremented when any of the Licenses targeted to that License Owner is changed or is removed indicating a change for one of the Licenses. When a License Owner releases a License to a Domain, the License Owner attributes the License with the current value of the licenseConfigNr. The current value of the licenseConfigNr is also attributed to the LinkLO. Since we assume the Domain to issue LinkLOs, this licenseConfigNr must first be communicated in a protocol to the Domain that securely manages the most recent licenseConfigNr for each associated License Owner to be able to issue a new LinkLO with an updated licenseConfigNr. The Control in the LinkLO will, during path evaluation, perform the check of the licenseConfigNr attributed to the License with the one attributed to the LinkLO.

The LinkLO, as known by the License Owner, is attached to a License when released to a Domain. The License Owner receives this link in a protocol with the Domain. Since the distribution of LinkLO attached to a License is an optional alternative one on top of the standard distribution from the Domain to the Clients, it is optional whether after an increment of the licenseConfigNr in the License Owner the License Owner needs to wait for communication with the Domain to receive the LinkLO with the updated licenseConfigNr.

The membership relation between a Client and a Domain is determined by the individual state mechanism. Membership can only be established using a protocol between the 2 parties and they both administer this fact in a state variable (DomainId for the Client). The LinkC is issued with a validity period. The LinkC is now only valid when the validity period is not expired AND the state variable DomainId related to the membership LinkC in the Client is still present. This is checked in the code of the Control of the LinkC when evaluation the LinkC searching for a path the License Owner as required in the License under evaluation.

The membership relation can be revoked in an online protocol between the Domain and the Client where they both agree to end the membership and each remove the related state variable from their administration. As a consequence the LinkC is disabled on the Client because there is no related state variable anymore.

The Domain manages a domainConfigNr that is incremented when any of the relations in the Domain configuration changes. These changes are: an increment of the licenseConfigNr of any of the License Owners associated with the Domain, a change or removal of any of the associations of License Owners with the Domain, and a change or removal of any of the memberships of Clients with the Domain. The Domain attributes the current value of the domainConfigNr to the LinkC and the LinkLO.

The links of a Domain can reach a Client by direct communication between the Domain and the Client and a LinkLO can reach a Client via a License acquired by the Client. A Client manages per Domain it is member of a state variable for the most recent domainConfigNr known by the Client. This domainConfigNr indicates validity for Links. When one of the Links carry a domainConfigNr as attribute that has a lower value than the one managed securely by the Client the Link is regarded as invalid and must be renewed when possible. This check is performed by code in the Control of the Links during path evaluation, requiring that the value of the domainConfigNr in the Link under evaluation must not be lower than the one managed by the Client.

Clients manage a domainConfigNr state variable for every Domain they are member of This state variable is updated in an online protocol between the Client and the Domain.

Links on a Client are now only valid when their validity period is not expired AND the state variable DomainId related to the membership LinkC in the Client is still present AND their domainConfigNr value is not lower then the one in the Client state administration. This is checked in the code of the Control of the Links when evaluation the Links searching for a path the License Owner as required in the License under evaluation. The Control in the LinkLO will also perform the check of the licenseConfigNr attributed to the License with the one attributed to the LinkLO.

Note that there is now a double state administration for LinkC: one with the individual state (DomainId in Client) and one via the domainConfigNr. An alternative configuration can be a LinkC without the domainConfigNr as an attribute and not testing the LinkC against the domainConfigNr in the state administration of the Client. The behaviour is similar, but the LinkC does not need to be issued with every change of the domainConfigNr.

Note that the DomainId of Domain Links could be derived from their implicit direction administration, but the more robust solution is to attribute every Link for a Domain with the DomainId. This is however not illustrated in the figure.

Clients and License Owners are forced by the validity periods on the LinkLO and LinkC to communicate on a regular basis the reconfirm their relationship with the Domain and to receive updated Domain configuration information. These validity periods are indicated in the figure as LO-validityperiod and C-validityperiod, respectively.

Features of Solution:

| Aspect/Action | |
|---|---|
| New links to Client with offline Domain and/or License Owner | LinkLO attached to License proliferated to Client without online Domain or License Owner needed. |
| Not connecting License Owner | Broken relation and no access to Content after expiration of current LO-validityperiod. |
| Not connecting Client | Broken relations and no access to Content after expiration of current LO-validityperiod per License Owner or C-validityperiod. |
| Deregister a Client from a Domain | Immediately Client will not access any Domain Content. All remaining Links must be renewed. |
| Disassociate a License Owner from a Domain | Wait for the min(rest of current LO-validityperiod, max(rest of the current C-validityperiods)) before all Clients will no longer access any Content of the disassociated License Owner. All remaining Links must be renewed (alternative only all LinkLOs). |
| Remove a License from a License Owner | Wait for (if License Owner and Domain connected: min(rest of current LO-validityperiod, max(rest of current C-validityperiods)) else rest of current LO-validityperiod) before Client will no longer access Content of removed License. All remaining Licenses of License Owner must be renewed. All Links must be renewed (alternative only all LinkLOs). |
| Change a License (user defined restrictions) | Increment licenseConfigNr as if a License was removed. |
| Size of Client secure state administration | #domains * (DomainId + domainConfigNr) |

2.5 Individual State for LinkC and LinkLO

This embodiment is illustrated in FIG. 7. The mechanisms applied are:

| Mechanism | Used for |
|---|---|
| 1.1 - Individual State for Relation | Guarding state of LinkC and LinkLO. |
| 1.2 - Validity Periods for Link | Guarding LinkC and LinkLO, enforcing propagation of licenseConfigNr and enforcing information exchange between License Owner and Domain and enforcing Domain configuration information exchange between Client and Domain. |
| 1.4 - Configuration number for Relations by State | Guarding state of all Licenses of a License Owner by a licenseConfigNr in state of Domain and state of Client. |

A License Owner has a licenseConfigNr that is incremented when any of the Licenses targeted to that License Owner is changed or is removed indicating a change for one of the Licenses. When a License Owner releases a License to a Domain, the License Owner attributes the License with the current value of the licenseConfigNr.

The current value of the licenseConfigNr is communicated in a protocol to the Domain that securely manages the most recent licenseConfigNr for each associated License Owner.

The association relation between a License Owner and a Domain is determined by the individual state mechanism. An association relation can only be established using a protocol between the 2 parties and they both administer this fact in a state variable (DomainId for the License Owner and LicenseOwnerId for the Domain). The association relation can be revoked in an online protocol between the Domain and the License Owner where they both agree to end the association and each remove the related state variables from their administration. The state administration of a Domain is propagated to Clients when they are or when they become in contact with each other.

The membership relation between a Client and a Domain is determined by the individual state mechanism. Membership can only be established using a protocol between the 2 parties and they both administer this fact in a state variable (DomainId for the Client and ClientId for the Domain).

For each Domain a Client is member of it will hold a copy of the state administration of the Domain with respect to the License Owners associated with the Domain. The membership relation can be revoked in an online protocol between the Domain and the Client where they both agree to end the membership and each remove the related state variables from their administration.

The links of a Domain can reach a Client by direct communication between the Domain and the Client. Links on a Client are now only valid when their validity period is not expired AND the state variable DomainId related to the membership in the Client state administration is still present. This is checked in the code of the Control of the Links when evaluation the Links searching for a path the License Owner as required in the License under evaluation. The Control code of the LinkLO will perform the additional checks that the LicenseOwnerId for the LinkLO is still registered as associated in the Client's state administration and that the value of licenseConfigNr of the License under evaluation is equal to- or greater than the one in the Client's state administration.

Note that the DomainId of Domain Links could be derived from their implicit direction administration, but the more robust solution is to attribute every Link for a Domain with the DomainId. The same holds for adding an explicit LicenseOwnerId to the LinkLO. This is however not illustrated in the figure.

Clients and License Owners are forced by the validity periods on the LinkLO and LinkC to communicate on a regular basis the reconfirm their relationship with the Domain and to receive updated Domain configuration information. These validity periods are indicated in the figure as LO-validityperiod and C-validityperiod, respectively.

Since the association relation (LinkLO), compared with solution 2.4 Individual state for LinkC and Domain state for LinkLO, is now guarded by an individual state variable in the Client, it has no use adding a LinkLO to a License, because the Client that acquires the License can not use the LinkLO on its own to establish proof of the association; this can only be done with an online protocol.

Note that an alternative deployment for this solution can be the transfer of the validity period attributes (and the other not shown attributes) of the links to the state administration. This means that the verification of a membership or association relation comprises evaluating a validity period of the relation in question as expressed by the state information and successfully verifying the association in question only if the validity period has not expired.

Features of Solution:

| Aspect/Action | |
|---|---|
| New links to Client with offline Domain and/or License Owner | No offline creation of state in Client. |
| Not connecting License Owner | Broken relation and no access to Content after expiration of current LO-validityperiod. |
| Not connecting Client | Broken relations and no access to Content after expiration of current LO-validityperiod per License Owner or C-validityperiod. |
| Deregister a Client from a Domain | Immediately Client will not access any Domain Content. |
| Disassociate a License Owner from a Domain | Wait for the min(rest of current LO-validityperiod, max(rest of the current C-validityperiods)) before all Clients will no longer access any Content of the disassociated License Owner. No renewal of Links needed. |
| Remove a License from a License Owner | Wait for (if License Owner and Domain connected: min(rest of current LO-validityperiod, max(rest of current C-validityperiods)) else rest of current LO-validityperiod) before Client will no longer access Content of removed License.All remaining Licenses of License Owner must be renewed.No renewal of Links needed. |
| Change a License (user defined restrictions) | Increment licenseConfigNr as if a License was removed. |
| Size of Client secure state administration | #domains * (DomainId + #LO * (LicenseOwnerId + licenseConfigNr)) |

2.6 Individual State for LinkC, LinkLO and License

This embodiment is illustrated in FIG. 8. The mechanisms applied are:

| Mechanism | Used for |
|---|---|
| 1.1 - Individual State for Relation | Guarding state of LinkC, LinkLO and License. |
| 1.2 - Validity Periods for Link | Guarding LinkC and LinkLO, enforcing information exchange between License Owner and Domain and enforcing Domain configuration information exchange between Client and Domain. |

This solution differs from the solution 2.5—Individual state for LinkC and LinkLO in the fact that not a licenseConfigNr mechanism is used to guard the state of all Licenses targeted to a License Owner but that all Licenses get each an individual state variable in the state administration of the Domain and Clients. Now every attest on the Client needs a corresponding state variable in the Client's state administration to be regarded as valid in a License evaluation.

The links of a Domain can reach a Client by direct communication between the Domain and the Client. Links on a Client are now only valid when their validity period is not expired AND the state variable DomainId related to the membership in the Client state administration is still present. This is checked in the code of the Control of the Links when evaluation the Links searching for a path the License Owner as required in the License under evaluation. The Control code of the LinkLO will perform the additional checks that the LicenseOwnerId for the LinkLO is still registered as associated in the Client's state administration and that the LicenseId of the License under evaluation is still registered in the Client's state administration. Note that this last check for LicenseId can also be allocated in the Control code of the License itself. In the latter case this has as a consequence that a solution system specific check is to be added to the Control signed by the original content provider or released License are changed and signed by the License Owner.

Note that the LicenseId of a License must be available in the License. This is however not illustrated in the figure, as is the case with the other Id of the entities.

An alternative for managing state variables (in secure memory) of entities and communicating them on an individual basis to other entities to update their internal state structures is the definition of signed and versioned attests containing entire structures defining state. These attests can be distributed freely among entities, just like the other attests and only a single state variable for the version of such an attest needs to be managed securely by entities.

As an example in this solution, a Domain can issue an attest with a list of all LicenseOwnerId associated with the Domain along with all the LicenseIds per LicenseOwnerId of Licenses targeted to the corresponding License Owner and released to the Domain. A Client manages the version number of such a white list containing the ids of the Licenses that are valid according the state administration securely. The attest, that can be large is size, need not be stored securely and need not be communicated to the Client by an online secure protocol.

The behaviour for such a mechanism with respect to the state administration of the version variable is already described in solution 2.1—No enforcement by validity periods for the domainConfigNr. There the technique is used for a set of Links; here it can be used for a set of state variables in any structure. The technique is not described as a separate mechanism for the invention, but it can of course be applied in combination with most of the other solutions as well.

Note that an alternative deployment for this solution can be the transfer of the validity period attributes (and the other not shown attributes) of the links to the state administration. This means that the verification of a membership or association relation, as well as the validity of a License, comprises evaluating a validity period of the relation in question as expressed by the state information and successfully verifying the association in question only if the validity period has not expired.

Features of Solution:

| Aspect/Action | |
|---|---|
| New links to Client with offline Domain and/or License Owner | No offline creation of state in Client. |
| Not connecting License Owner | Broken relation and no access to Content after expiration of current LO-validityperiod. |
| Not connecting Client | Broken relations and no access to Content after expiration of current LO-validityperiod per License Owner or C-validityperiod. |
| Deregister a Client from a Domain | Immediately Client will not access any Domain Content. |
| Disassociate a License Owner from a Domain | Wait for the min(rest of current LO-validityperiod, max(rest of the current C-validityperiods)) before all Clients will no longer access any Content of the disassociated License Owner. No renewal of Links needed. |
| Remove a License from a License Owner | Wait for (if License Owner and Domain connected: min(rest of current LO-validityperiod, max(rest of current C-validityperiods)) else rest of current LO-validityperiod) before Client will no longer access Content of removed License. No renewal of Licenses needed. No renewal of Links needed. |
| Change a License (user defined restrictions) | Not supported. |
| Size of Client secure state administration | #domains * (DomainId + #LO * (LicenseOwnerId + #Lics * LicenseId)) |

2.7 Individual State for all Relations with Version Control on Licenses

This embodiment is illustrated in FIG. 9. The mechanisms applied are:

| Mechanism | Used for |
|---|---|
| 1.1 - Individual State for Relation | Guarding state of LinkC, LinkLO and License. |
| 1.2 - Validity Periods for Link | Guarding LinkC and LinkLO, enforcing information exchange between License Owner and Domain and enforcing Domain configuration information exchange between Client and Domain. |
| 1.6 - Version number for Relation by State | Guarding state of versions of a License. |

This solution differs from the solution 2.6—Individual state for LinkC, LinkLO and License in the support of versions of Licenses in state. A License Owner has now for every License that is targeted to him in his state administration a LicControlVersionNr. A License released to the Domain by a License Owner is attributed with the actual value of the LicControlVersionNr and the LicControlVersionNr is communicated to the Domain(s) and from there to the Clients to be incorporated in their state administrations.

A License Owner will increment its LicControlVersionNr when an essential change is made to a License. Previous versions of the License released to a Domain will end up useless (in time) because they carry an elder version number than the one registered in the state administration of the Clients.

The check for the presence of the LicenseId of the License under evaluation in the Client's state administration as element of the LicenseOwnerId as element of the DomainId is extended with the check that the value of the registered LicControlVersionNr for the LicenseOwnerId is not higher than the value of the LicControlVersionNr attributed to the License.

Again it is optional to allocate this check in the Control code of the LinkLO or in the Control code of the License itself.

Note that an alternative deployment for this solution can be the transfer of the validity period attributes (and the other not shown attributes) of the links to the state administration.

Features of Solution:

| Aspect/Action | |
|---|---|
| New links to Client with offline Domain and/or License Owner | No offline creation of state in Client. |
| Not connecting License Owner | Broken relation and no access to Content after expiration of current LO-validityperiod. |
| Not connecting Client | Broken relations and no access to Content after expiration of current LO-validityperiod per License Owner or C-validityperiod. |
| Deregister a Client from a Domain | Immediately Client will not access any Domain Content. |

| Aspect/Action | |
|---|---|
| Disassociate a License Owner from a Domain | Wait for the min(rest of current LO-validityperiod, max(rest of the current C-validityperiods)) before all Clients will no longer access any Content of the disassociated License Owner. No renewal of Links needed. |
| Remove a License from a License Owner | Wait for (if License Owner and Domain connected: min(rest of current LO-validityperiod, max(rest of current C-validityperiods)) else rest of current LO-validityperiod) before Client will no longer access Content of removed License. No renewal of Licenses needed. No renewal of Links needed. |
| Change a License (user defined restrictions) | Wait for (if License Owner and Domain connected: min(rest of current LO-validityperiod, max(rest of current C-validityperiods)) else rest of current LO-validityperiod) before Client will no longer use a previous version of the License. The changed License must be renewed. |
| Size of Client secure state administration | #domains * (DomainId + #LO * (LicenseOwnerId + #Lics * (LicenseId+ LicControlVersionNr)) |

2.8 Parallel License Linking

This embodiment is illustrated in FIG. 10. The mechanisms applied are:

| Mechanism | Used for |
|---|---|
| 1.1 - Individual State for Relation | Guarding state of LinkC, LinkLO and License. |
| 1.2 - Validity Periods for Link | Guarding LinkC and LinkLO, enforcing information exchange between License Owner and Domain and enforcing Domain configuration information exchange between Client and Domain. |
| 1.6 - Version number for Relation by State | Guarding state of versions of a LinkLic. |
| 1.8 - Parallel License Linking for separation of areas of control | Isolating user-defined restrictions in the Control of the LinkLic. |

This solution demonstrates the usage of the Parallel License Linking mechanism on top of the configuration as described in solution 2.7—Individual state for all relations with version control on Licenses. See the description of the parallel mechanism as a reference for this solution. The LinkLic is a link from the License Owner to the License that is targeted to the License Owner. A LicControlVersionNr is used now for version control in state for the LinkLic, which Control is more likely to change than the License with the Control of the original content provider. When also for the License versioning is required an additional version nr can be used next to- and operating independent from the LicControlVersionNr.

Same features as with solution 2.7—Individual state for all relations with version control on Licenses with additional advantage of separated areas of control where the user-defined restrictions can be changed without changing the License.

2.9 Serial License Linking

This embodiment is illustrated in FIG. 11. The mechanisms applied are:

| Mechanism | Used for |
|---|---|
| 1.1 - Individual State for Relation | Guarding state of LinkC, LinkLO and License. |
| 1.2 - Validity Periods for Link | Guarding LinkC and LinkLO, enforcing information exchange between License Owner and Domain and enforcing Domain configuration information exchange between Client and Domain. |
| 1.6 - Version number for Relation by State | Guarding state of versions of a LinkLic. |
| 1.9 - Serial License Linking for separation of areas of control | Isolating user-defined restrictions in the Control of the LinkLic. |

This solution demonstrates the usage of the Serial License Linking mechanism on top of the configuration as described in solution 2.7—Individual state for all relations with version control on Licenses. See the description of the serial mechanism as a reference for this solution. The LinkLic is a link from the License Owner to the License that is not targeted to the License Owner. The LinkLic does the coupling of Content to a License Owner making this link an essential element in the Content—acquisition and moving process. A LicControlVersionNr is used now for version control in state for the LinkLic, which Control is more likely to change than the License with the Control of the original content provider. When also for the License versioning is required an additional version nr can be used next to- and operating independent from the LicControlVersionNr.

Features of Solution:

Same features as with solution 2.7—Individual state for all relations with version control on Licenses with additional advantages:

Separated areas of control where the user-defined restrictions can be changed without changing the License;

No retargeting needed in Control of License signed by the original content provider.

Further Improvements

User-defined restrictions may be added in accordance with the method disclosed in international patent application WO 05/111760.

In some embodiments above, disassociating a License Owner from a Domain requires Clients to wait for a certain period, usually the rest of the current LO-validityperiod, before Clients will no longer access any Domain Content of the disassociated License Owner. This period then acts as a grace period during which Domain Content from that Domain is still accessible. After this grace period the Domain association is cancelled.

A system may implement a maximum number of Domain associations that may exist simultaneously (active Domains).

Usually this would be done with a counter that is increased when a Domain is created, and decreased if a Domain association is cancelled. If this counter equals the maximum, and the user disassociates a License Owner from one of his Domains, the creation of a new Domain association will not be permitted until the end of the grace period, because only at that time the counter is decreased. This is inconvenient for users, as they expect to be able to create a new Domain association directly after the act of disassociating a License Owner from an existing Domain.

To improve on the above, the system should implement a separate counter for the number of domains in the grace period (old Domain counter). Directly after the License Owner is disassociated from the Domain, the active Domain counter is decreased by one. This allows for the creation of a new Domain association right away.

In addition to decreasing the active Domain counter, the old Domain counter is increased. After the expiry of the grace period, the old Domain counter is decreased. This way active Domains and Domains in their grace periods are separately tracked.

If the active Domain counter has reached its maximum, no new Domain associations may be created. Because the active Domain counter is now decreased as soon as the user disassociates a License Owner from a Domain, the above-mentioned inconvenience is reduced.

A user may still be unable to create a new Domain association directly after disassociating a License Owner. This will happen if the old Domain counter has reached its maximum, and also the active Domain counter has reached its maximum. This however is a much more extreme situation: the user would have to have not only the maximum number of active Domains, but also the maximum number of Domains still in their grace periods.

By carefully choosing both maxima, this possibility can be significantly reduced.

Final Notes

In the above, the statement "min(A, B)" should be interpreted as the lesser of A and B, and the statement "max(A, B)" should be interpreted as the greater of A and B.

In this document, the following definitions are used:

| Term | Definition |
| --- | --- |
| Association | The result of establishing a relationship between a License Owner and a Domain. |
| Client | Functional entity that can acquire and parse Licenses and Links for the purpose of getting access to an instance of Content based on the rights expressed in those Licenses and Links |
| Content | Any data that is intended to be accessed for human consumption securely managed by a Domain compliant system. |
| Control Object | A representation of rules that govern access to content by granting or denying the use of the Content key for Content they control. They can also be used to represent constraints on the validity of a Link object in which they are embedded. They can also be used as standalone program containers that are run on behalf of another entity, such as in agents or delegates. Controls contain metadata and byte-code programs, which implement a specific interaction protocol. |
| Device | A software application and/or hardware component able to host a Client. |
| Domain | A uniquely identified collection of Clients and License Owners. |
| Domain configuration | The constellation of the relations constituting a Domain where individual relations can be expressed in an attest. |
| Domain Content | Content that has been Released for a Domain. |
| License | An expression of the rights a Principal has for a specific instance of Content. |
| License Owner | A representative of a User in a Domain environment that can be granted rights for an instance of Content. |
| Membership | The result of establishing a relationship between a Client and a Domain. |
| Member Client | A Client that is member of a specific Domain. |
| Principal | A system entity whose identity can be authenticated. |
| Release | The process of granting all or a subset of rights for an instance of Content, for use within the Domain. |
| Target | Establishing a relationship between a License and a License Owner. |
| User | The individual that interacts with the system, the Devices and Services. A collection of License Owners represent the User within the system. |
| Usage Rules | A set of rights that governs use of protected Content. Note: Usage Rules MAY be explicitly expressed in a License or be determined elsewhere, e.g. through regulation or in application-level permissions. |

It should be noted that the above-mentioned embodiments illustrate rather than limit the invention, and that those skilled in the art will be able to design many alternative embodiments without departing from the scope of the appended claims.

Throughout the figures, same reference numerals indicate similar or corresponding features. Some of the features indicated in the drawings are typically implemented in software, and as such represent software entities, such as software modules or objects.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In device or system claims enumerating several means, some or all of these means can be embodied by one and the same item of hardware. The mere fact that certain measures are recited in mutually different dependent claims does not indicate that a combination of these measures cannot be used to advantage.

The invention claimed is:

1. A method of digital rights management in a domain, wherein an association relation between a license owner and the domain is expressed in a certificate in which the license owner and the domain are identified, and wherein a membership relation between a client and the domain is expressed in a certificate in which the client and the domain are identified, the method comprising:

verifying the existence of a membership relation between the client and the domain as reflected in a first state variable, and verifying that the value of a domain configuration number attributed to the certificate expressing the membership relation between the client and the domain is equal to- or greater than the value of the first state variable, the first state variable is maintained both by the client and by a controller of the domain and is incremented when a relation in the domain changes, and verifying the existence of an association relation between the license owner and the domain as reflected in a second state variable maintained both by the controller of the domain and by a license owner controller associated with the license owner, granting access to a piece of content in accordance with a license owned by the license owner to the client who is a member of the domain, conditional upon successfully: verifying the existence of the membership relation, and verifying the value of the domain configuration number, and verifying the existence of the association relation;

and otherwise:

revoking the membership relation by executing an online protocol between the controller of the domain and the client after which both remove the first state variable, and revoking the association relation by executing an online protocol between the license owner controller and the controller of the domain after which the controller of the domain removes the second state variable and after which the state administration relating to the domain is propagated to the client so that the second state variable is removed by the client.

2. The method of claim 1, in which the state administration includes a validity period of the association relation and the membership relation, and the verification of the association relation and the membership relation comprises evaluating a validity period of the relation in question as expressed by the state administration and successfully verifying the association in question only if the validity period has not expired.

3. The method of claim 1, in which further the domain controller and the client maintain a third state variable to guard the state of the license, and the third state variable permits the invalidation of the license by being removed.

4. The method of claim 3, in which the third state variable contains a representation of an identifier for the license.

5. The method of claim 3, in which the controller of the license owner creates the third state variable and propagates the third state variable to the domain controller who propagates the third state variable to the client.

6. The method of claim 1, in which the certificate carries an identification of its validity period.

7. The method of claim 1, wherein the client has a state administration comprising the first and second state variable and wherein the domain controller propagates a state administration relating to the domain to the client, so that the client can update its state administration and remove the second state variable reflecting the association relation.

8. A system for digital rights management in a domain, wherein an association relation between a license owner and the domain is expressed in a certificate in which the license owner and the domain are identified, and wherein a membership relation between a client and the domain is expressed in a certificate in which the client and the domain are identified, the system is configured for granting access to a piece of content in accordance with a license owned by the license owner to the client who is a member of the domain, conditional upon successfully:

verifying the existence of a membership relation between the client and the domain as reflected in a first state variable, and that the value of a domain configuration number attributed to the certificate expressing the membership relation between the client and the domain is equal to- or greater than the value of the first state variable, and verifying the existence of an association relation between the license owner and the domain as reflected in a second state variable, the client and a controller of the domain being configured to both maintain the first state variable, and to increment the first state variable when a relation in the domain changes and being configured to revoke the membership relation by executing an online protocol between them after which both remove the first state variable, the controller of the domain and a license owner controller associated with the license owner being configured to both maintain the second state variable, and being configured to revoke the association relation by executing an online protocol between them after which both remove the second state variable, the controller of the domain further being configured to propagate the state administration relating to the domain to the client for causing the client to remove the second state variable.

* * * * *